(12) United States Patent
Tomida

(10) Patent No.: US 10,493,803 B2
(45) Date of Patent: Dec. 3, 2019

(54) PNEUMATIC RADIAL TIRE FOR PASSENGER VEHICLES

(71) Applicant: BRIDGESTONE CORPORATION, Chuo-ku, Tokyo (JP)

(72) Inventor: Tatsuya Tomida, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 658 days.

(21) Appl. No.: 14/765,604

(22) PCT Filed: Jan. 24, 2014

(86) PCT No.: PCT/JP2014/000367
§ 371 (c)(1),
(2) Date: Aug. 4, 2015

(87) PCT Pub. No.: WO2014/132551
PCT Pub. Date: Sep. 4, 2014

(65) Prior Publication Data
US 2015/0367684 A1     Dec. 24, 2015

(30) Foreign Application Priority Data

Feb. 28, 2013  (JP) .................................. 2013-039733

(51) Int. Cl.
*B60C 11/03* (2006.01)
*B60C 3/04* (2006.01)

(52) U.S. Cl.
CPC ............ *B60C 11/0309* (2013.01); *B60C 3/04* (2013.01); *B60C 2011/0341* (2013.01); *B60C 2011/0365* (2013.01)

(58) Field of Classification Search
CPC ............. B60C 11/0309; B60C 11/0304; B60C 11/033; B60C 11/1392; B60C 3/04;
(Continued)

(56) References Cited

U.S. PATENT DOCUMENTS

| 2005/0183807 | A1* | 8/2005 | Hildebrand | ......... B60C 11/0306 152/209.2 |
| 2013/0048173 | A1* | 2/2013 | Kiwaki | ............... B60C 11/0309 152/209.18 |
| 2014/0138003 | A1* | 5/2014 | Kuwayama | ............... B60C 3/04 152/454 |

FOREIGN PATENT DOCUMENTS

| CN | 101306631 A | 11/2008 |
| CN | 101890881 A | 11/2010 |

(Continued)

OTHER PUBLICATIONS

Machine translation of JP08-530004 (no date).*

(Continued)

*Primary Examiner* — Steven D Maki
*Assistant Examiner* — Philip N Schwartz
(74) *Attorney, Agent, or Firm* — Kenja IP Law PC

(57) ABSTRACT

A pneumatic radial tire for passenger vehicles. When the tire is fitted on a rim and having an internal pressure of 250 kPa or higher, the section width SW and the outer diameter OD of the tire satisfy a predetermined relationship. A center land row is a rib-shaped land, and has center lug grooves each opening into one of the two circumferential main grooves and terminating within the center land row. Outer land rows are rib-shaped lands, each outer land row having outer lug grooves and outer auxiliary lug grooves. The outer lug grooves each open into a ground contact end in the tire width direction and terminate within the outer land row. The outer auxiliary lug grooves open into the circumferential main groove defining the outer land row, has a groove width smaller than the groove width of the outer lug grooves, and extend in the tread width direction.

17 Claims, 16 Drawing Sheets

(58) Field of Classification Search
CPC ..... B60C 2011/0381; B60C 2011/0341; B60C 2011/0365; B60C 2011/0395; B60C 2011/0353
See application file for complete search history.

(56) References Cited

FOREIGN PATENT DOCUMENTS

| | | | | | |
|---|---|---|---|---|---|
| JP | 02179508 | A | * | 7/1990 | ......... B60C 11/0309 |
| JP | 08053004 | A | * | 2/1996 | ......... B60C 11/0318 |
| JP | H08-53004 | A | | 2/1996 | |
| JP | 2003146024 | A | * | 5/2003 | ............. B60C 11/12 |
| WO | WO 2011122170 | | * | 10/2011 | ......... B60C 11/0304 |
| WO | 2011/135774 | A1 | | 11/2011 | |
| WO | 2012/120826 | A1 | | 9/2012 | |
| WO | WO-2012176476 | A1 | * | 12/2012 | ............... B60C 3/04 |
| WO | 2013/014950 | A1 | | 1/2013 | |

OTHER PUBLICATIONS

Mar. 11, 2014 International Search Report issued in International Patent Application No. PCT/JP2014/000367.

Mar. 4, 2014, Notification of Reason for Refusal issued by the Japan Patent Office in the corresponding Japanese Patent Application No. 2013-039733.

\* cited by examiner

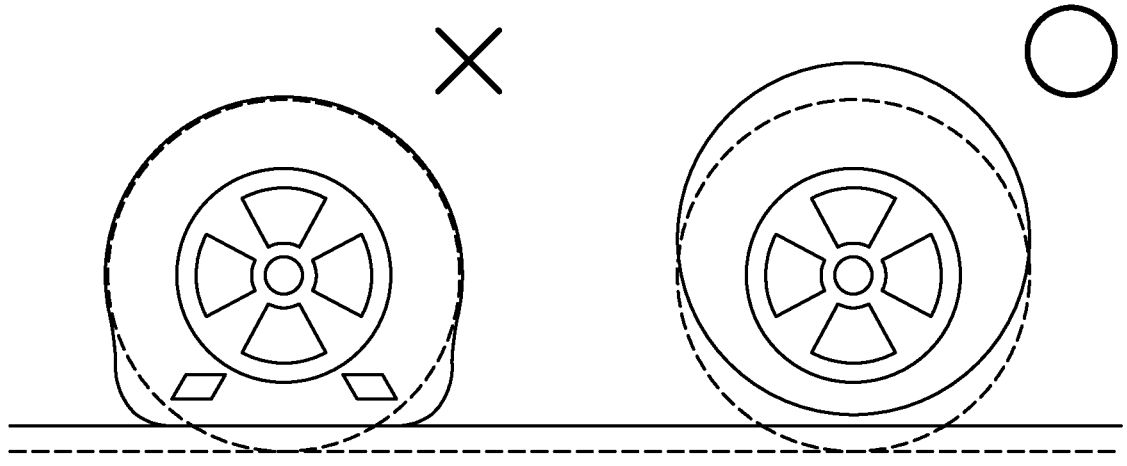
FIG. 3A RING DEFORMATION
FIG. 3B ECCENTRIC DEFORMATION
——— AFTER DEFORMATION
------ BEFORE DEFORMATION

GROUNDED SHAPE

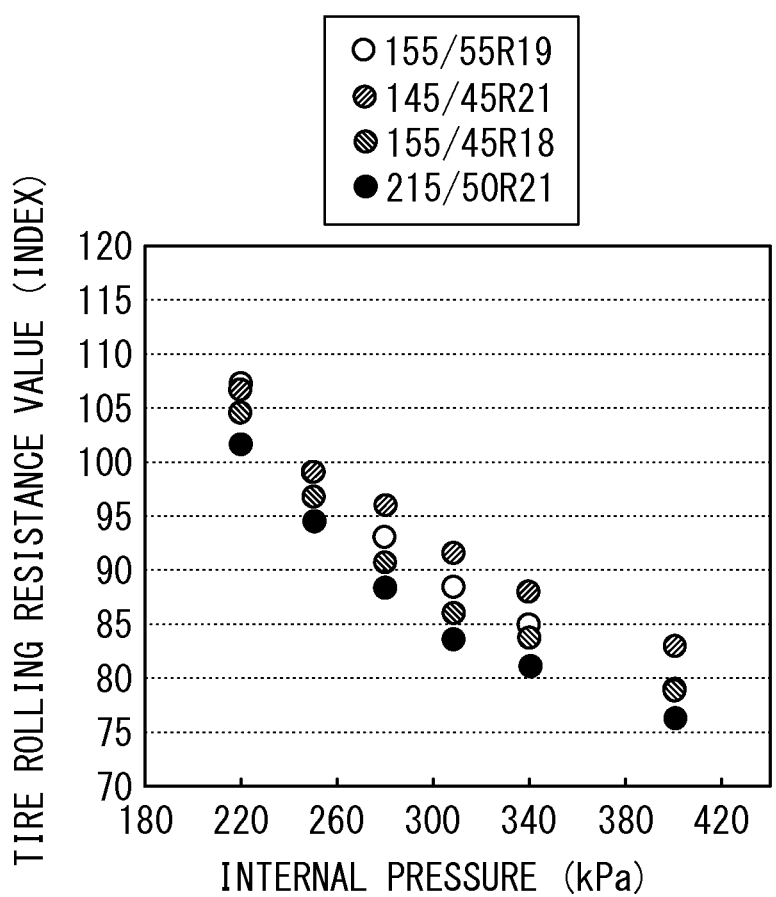

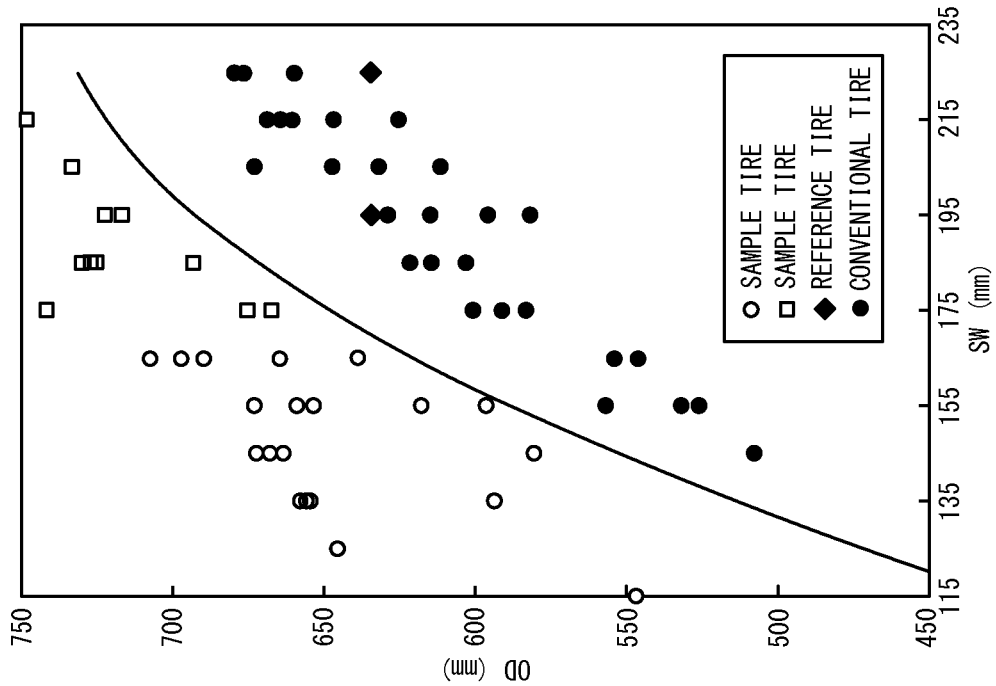
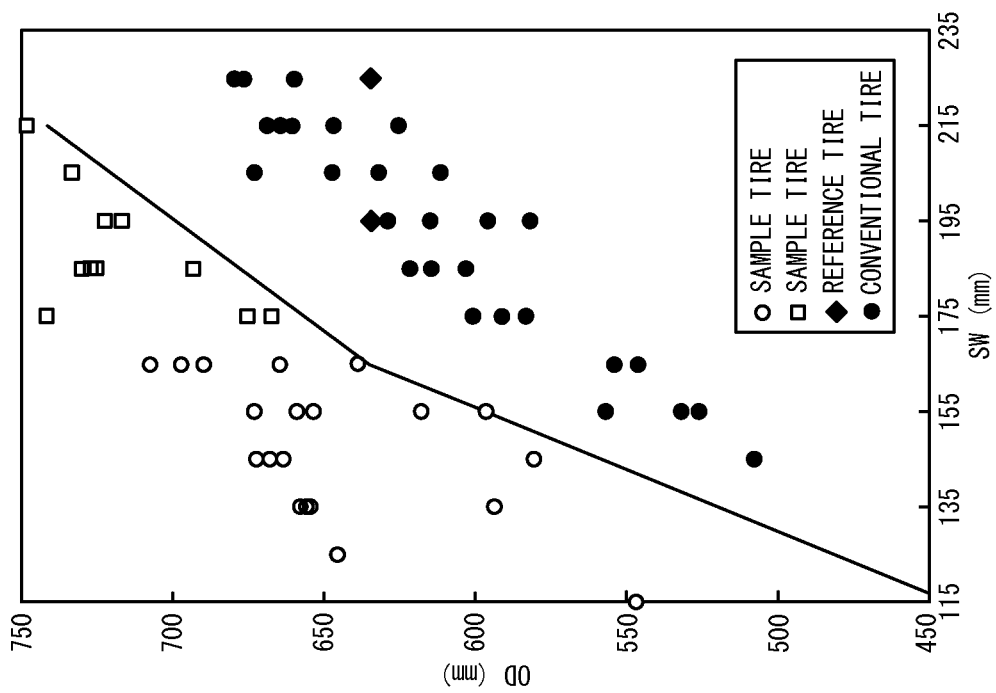

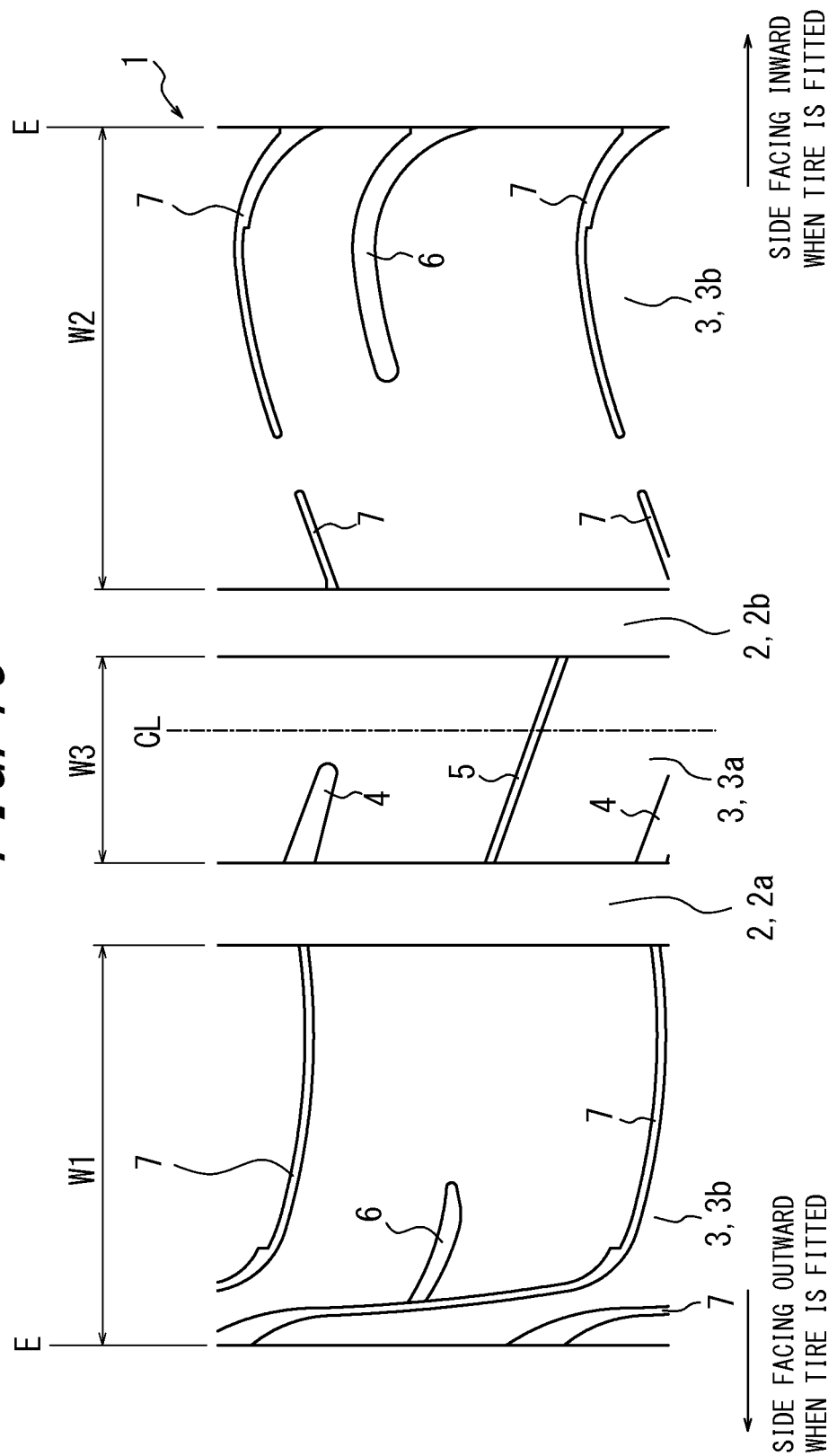

PNEUMATIC RADIAL TIRE FOR PASSENGER VEHICLES

TECHNICAL FIELD

The disclosure relates to a pneumatic radial tire for passenger vehicles.

BACKGROUND

Tires with a smaller width and a larger diameter have been conventionally proposed to reduce rolling resistance, as described in Patent Literature 1 (PTL 1). This technology is expected to be effectively used mainly in tires of electric vehicles.

CITATION LIST

Patent Literature

PTL 1: WO 2011/135774

SUMMARY

Technical Problem

The technology described in PTL 1 is fully effective in reducing rolling resistance. However, such tires with reduced width have smaller belt width in the tire width direction, so that the belt will be subjected to higher tensile force than is conventionally subjected to, which makes the vicinity of the tread highly rigid. Further, tires prepared to have high internal pressure may be used in order to retain a certain load capacity (see paragraph [0037] of PTL 1), which leaves room for improving silent performance in driving.

The disclosure herein is directed to addressing the above issues, and aims to provide a pneumatic radial tire for passenger vehicles that ensures both rolling resistance performance and silent performance.

Solution to Problem

The product as disclosed herein primarily features the following.

The pneumatic radial tire for passenger vehicles disclosed herein includes a carcass composed of plies of radially arranged cords toroidally extending between a pair of bead portions. When the tire is fitted on a rim and prepared to have an internal pressure of 250 kPa or higher, if the tire has a section width SW of less than 165 (mm), an SW/OD ratio of the section width SW to the outer diameter OD of the tire is 0.26 or less; and, if the tire has a section width of 165 (mm) or greater, the section width SW and the outer diameter OD of the tire satisfy the relational expression $OD \geq 2.135 \times SW + 282.3$. The tire has two circumferential main grooves extending in a tread circumference direction on a tread. The two circumferential main grooves and ground contact end in a tire width direction define a plurality of land rows. The land rows include a center land row defined between the two circumferential main grooves, and two outer land rows defined by the ground contact end in the tire width direction and the circumferential main grooves. The center land row is a rib-shaped land continuously extending in the tread circumference direction, and has center lug grooves each opening into one of the two circumferential main grooves and terminating within the center land row. The outer land rows are rib-shaped lands continuously extending in the tread circumference direction. Each of the outer land rows has outer lug grooves and outer auxiliary lug grooves. The outer lug grooves each open into one of the ground contact ends in the tire width direction and terminate within the corresponding outer land row. The outer auxiliary lug grooves open into the circumferential main groove defining the outer land row. The outer auxiliary lug grooves have a groove width smaller than the groove width of the outer lug grooves, and extend in the tread width direction. In this regard, the phrase "rib-shaped land(s) continuously extending in the tread circumference direction" means that the land rows are not interrupted by the center lug grooves or outer lug grooves in the tread circumference direction. The land rows that are interrupted, in the tread circumference direction, by the center auxiliary lug grooves or outer auxiliary lug grooves whose groove width is smaller than the groove width of the center lug grooves or outer lug grooves are considered to be the "rib-shaped land(s) continuously extending in the tread circumference direction". The term "two circumferential main grooves" are defined as grooves that continuously extend in the tread circumference direction with a groove width (an opening width) of 5 mm or greater. The term "ground contact end E in a tire width direction" refers to the outermost points, in the tire width direction, of the ground contact surface where the tire contacts the road surface, which is obtained when the tire is fitted on a rim, prepared to have an internal pressure corresponding to a maximum load prescribed for each vehicle on which the tire is fitted, and subjected to the maximum load.

For the pneumatic radial tire for passenger vehicles of the disclosure, the outer land rows preferably have a width, in the tread width direction, larger than the width, in the tread width direction, of the center land row. With this configuration, partial wear or the like in the tread width direction can be suppressed.

For the pneumatic radial tire for passenger vehicles of the disclosure, the center land row preferably has first center lug grooves each opening into one of the two circumferential main grooves and terminating within the center land row, the one of the circumferential main grooves being on the side that faces outward when the tire is fitted. The center land row preferably further has second center lug grooves or center auxiliary lug grooves, the second center lug grooves each opening into the other of the circumferential main grooves and terminating within the center land row, and the center auxiliary lug grooves each opening into the other of the circumferential main grooves to extend in the tread width direction within the center land row, the center auxiliary lug grooves having a groove width smaller than the groove width of the center lug grooves. The first center lug grooves opening into the one of the circumferential main grooves and the second center lug grooves or the center auxiliary lug grooves opening into the other of the circumferential main grooves are preferably alternatively arranged in the tread circumference direction. With this arrangement, steering stability can be improved.

In addition, for the pneumatic radial tire for passenger vehicles of the disclosure, the side edges of the land rows are preferably chamfered. With the chamfering, steering stability can be further improved.

Further, for the pneumatic radial tire for passenger vehicles of the disclosure, the outer land row disposed on the side that faces outward when the tire is fitted, of the two outer land rows, preferably has a negative ratio less than the negative ratio of the outer land row disposed on the side that faces inward when the tire is fitted. With this negative ratio, steering stability and drainage performance can be both ensured.

Further, for the pneumatic radial tire for passenger vehicles of the disclosure, the center auxiliary lug grooves and the outer auxiliary lug grooves preferably have a groove width of 0.4 to 1.5 mm. With the groove width within this range, drainage performance and silent performance can be both ensured.

Advantageous Effect

According to the disclosure, provided is a pneumatic radial tire for passenger vehicles that ensures both rolling resistance performance and silent performance.

BRIEF DESCRIPTION OF THE DRAWINGS

In the accompanying drawings:
FIGS. 3A and 3B are diagrams for illustrating the deformation of a tire;
FIG. 9 is a diagram showing the relationships between the internal pressure of tires and a rolling resistance value (RR value) of tires;
FIGS. 14A and 14B are diagrams showing the relationships between SW and OD for sample tires and conventional tires;
FIG. 16 is a development view showing a tread pattern of the tire in accordance with one embodiment of the disclosure.

DETAILED DESCRIPTION

Figure 1A:
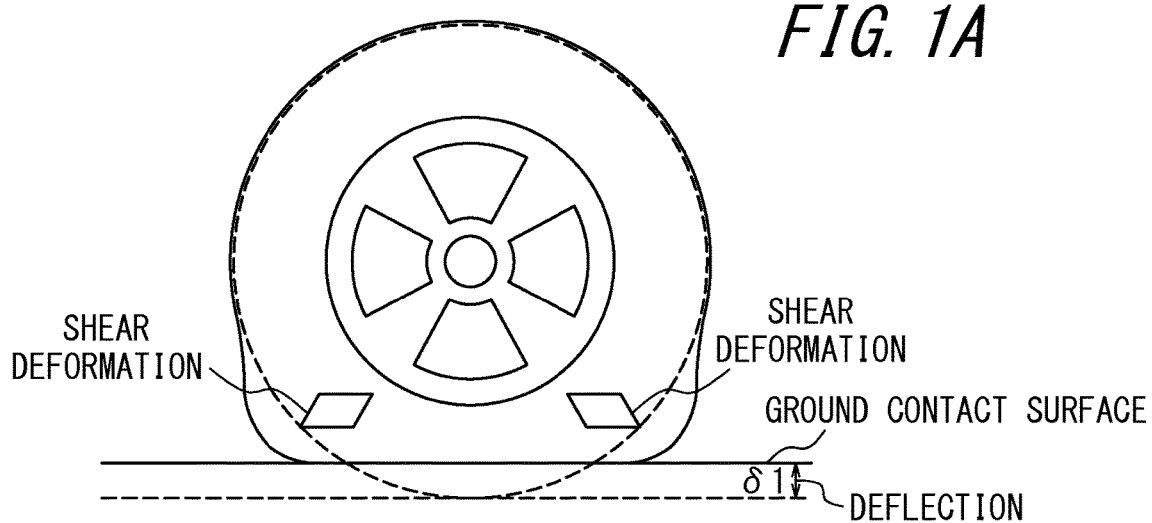
FIG. 1A is a side view of a tire.

The following describes how the pneumatic radial tire for passenger vehicles (hereinafter referred to as "tire") of the disclosure has been reached. FIG. 1A illustrates a tire whose tire crown is undergoing a deflection by being subjected to a load. The deflection at the crown causes a shear deformation of the tread rubber in the tire circumference direction, as schematically shown in FIG. 1A with parallelograms. This deformation repeatedly occurs as the tire rolls, causing energy loss to increase rolling resistance. Therefore, to reduce the rolling resistance value, reducing the deflection amount caused due to the ground contact of the tire is important in the first place.

Figure 1B:
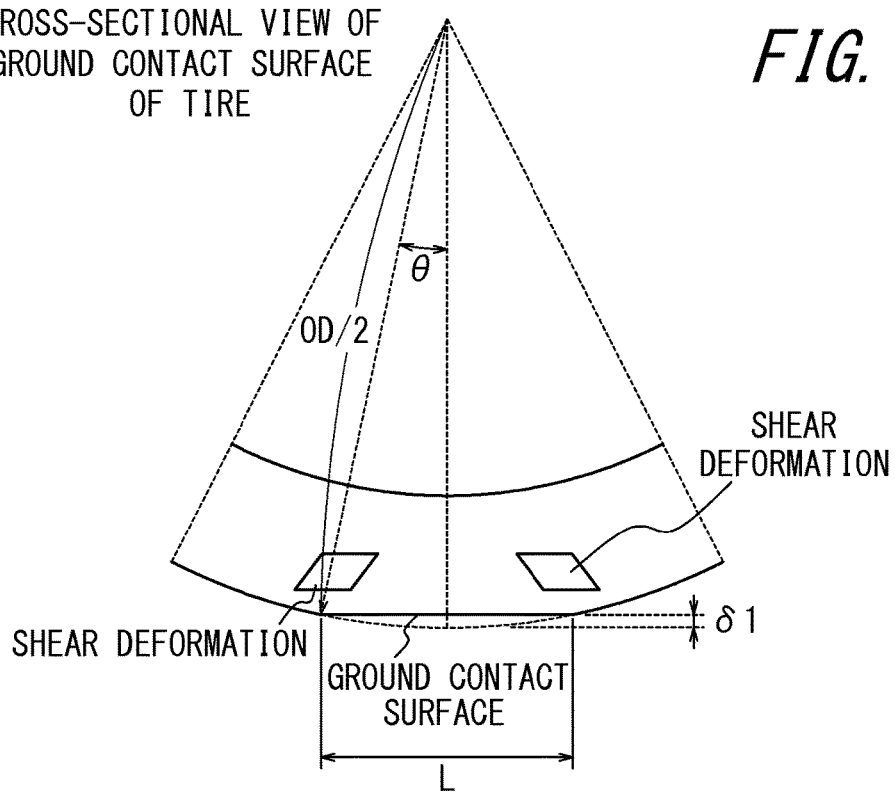
FIG. 1B is a circumferential cross-sectional view of the tire, showing the vicinity of the ground contact surface of the tire.

FIG. 1B is a circumferential cross-sectional view of the tire, showing the vicinity of the ground contact surface of the tire. As shown in FIG. 1B, the outer diameter of the tire is denoted as OD (mm), the deflection amount is denoted as δ1 (mm), and the circumferential ground contact length is denoted as L (mm). The deflection amount δ1 can be geometrically expressed by the following two expressions in terms of approximation.

$$\delta 1 = (OD/2) \times (1 - \cos \theta) \qquad \text{Expression 1:}$$

$$\theta \approx \tan^{-1}\{(L/2)/(OD/2)\} \approx L/OD \qquad \text{Expression 2:}$$

Figure 2:
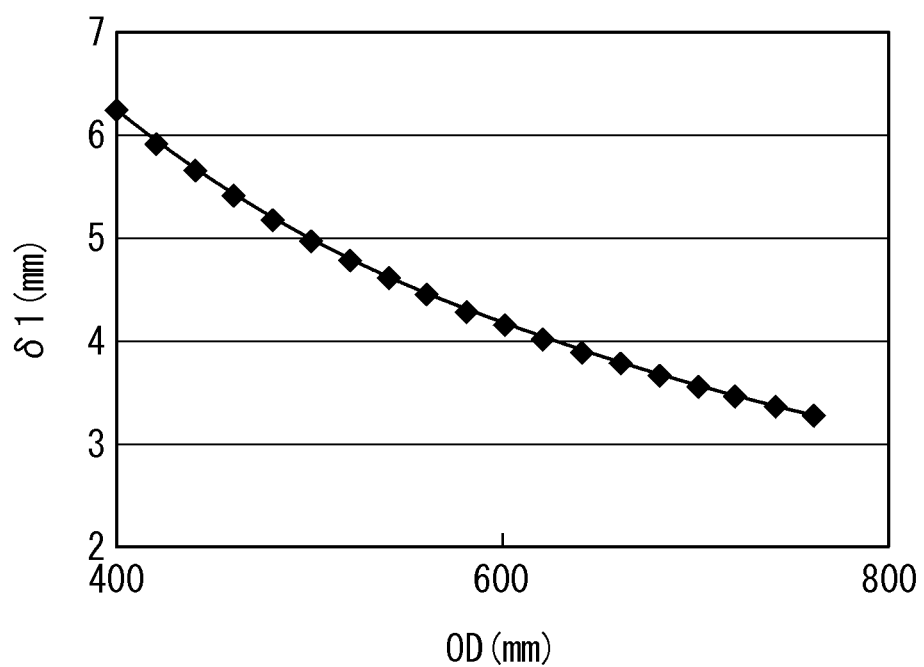
FIG. 2 is a diagram showing the relationships between the outer diameter OD of the tire and a deflection amount δ1.

FIG. 2 is a diagram showing the relationships between the tire outer diameter OD and the deflection amount δ1 of conventional tires of various sizes that are each fitted on an applicable rim, prepared to have a prescribed internal pressure, and subjected to a maximum load. The term "applicable rim" as used herein for conventional tires refers to a rim specified by an industrial standard effective in the region where the tire is produced and used. Examples of such an industrial standard include Year Book of JATMA (Japan Automobile Tyre Manufacturers Association, Inc.) in Japan, Standard Manual of ETRTO (European Tire and Rim Technical Organization) in Europe, and Year Book of TRA (Tire and Rim Association Inc.) in the United States. The "prescribed internal pressure" is based on the applicable rim and the correspondence table of air pressure to load capacity that correspond to the sizes of the radial ply tires specified by the above-mentioned industrial standards such as Year Book of JATMA (a standard of Japan Automobile Tyre Manufacturers Association, Inc.). The term "maximum load" refers to a maximum load (maximum load capacity) that a single wheel of an applicable size, specified by the above-mentioned prescribed industrial standards, can bear.

The expressions 1 and 2, and FIG. 2 demonstrate that increasing the tire outer diameter OD effectively reduces the deflection amount δ1. This means that increasing the tire diameter is an effective way to reduce the tire rolling resistance from the perspective of suppressing the shear deformation of the tread rubber in the tire circumference direction.

Further, the belt tension of a tire can be expressed by the following expression:

$$T = (OD/2) \times P \qquad \text{Expression 3:}$$

This demonstrates that an increased tire diameter increases the belt tension.

An increase in the belt tension increases the ring rigidity of the tire (i.e., the rigidity to maintain the ring shape of a tire). Thus, as shown in FIGS. 3A and 3B, an increase in belt tension keeps the ring shape of the tire and thus promotes the eccentric movement (eccentric deformation) of the whole ring. This suppresses the deformation of the tread rubber so that the rolling resistance value of a tire is reduced. This means that increasing the tire diameter is an effective way to reduce the tire rolling resistance value also from the perspective of suppressing the ring deformation of the tire.

Figure 4A:
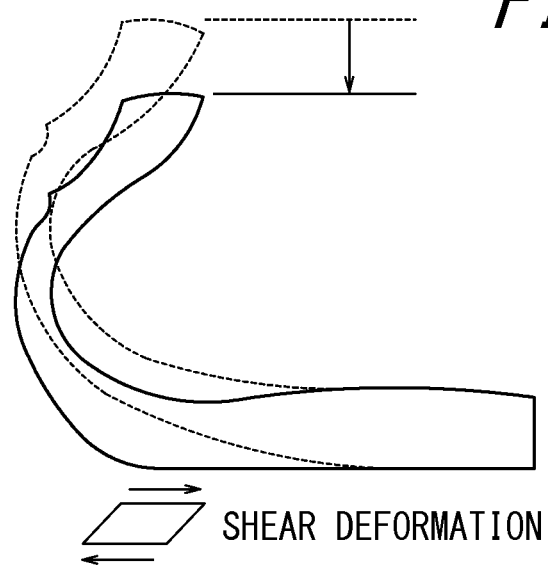
FIGS. 4A and 4B are cross-sectional views, in the width direction, of a tire, illustrating the deformation of the tire.

The inventor then focused on the shear deformation in the tire width direction of the tread rubber. Specifically, when a tire contacts the ground, its crown is deflected so that the tread rubber is subjected to a shear deformation in the tire width direction, as schematically shown in FIG. 4A with a parallelogram. This deformation repeatedly occurs as the tire rolls, causing energy loss to increase rolling resistance.

Figure 4B:
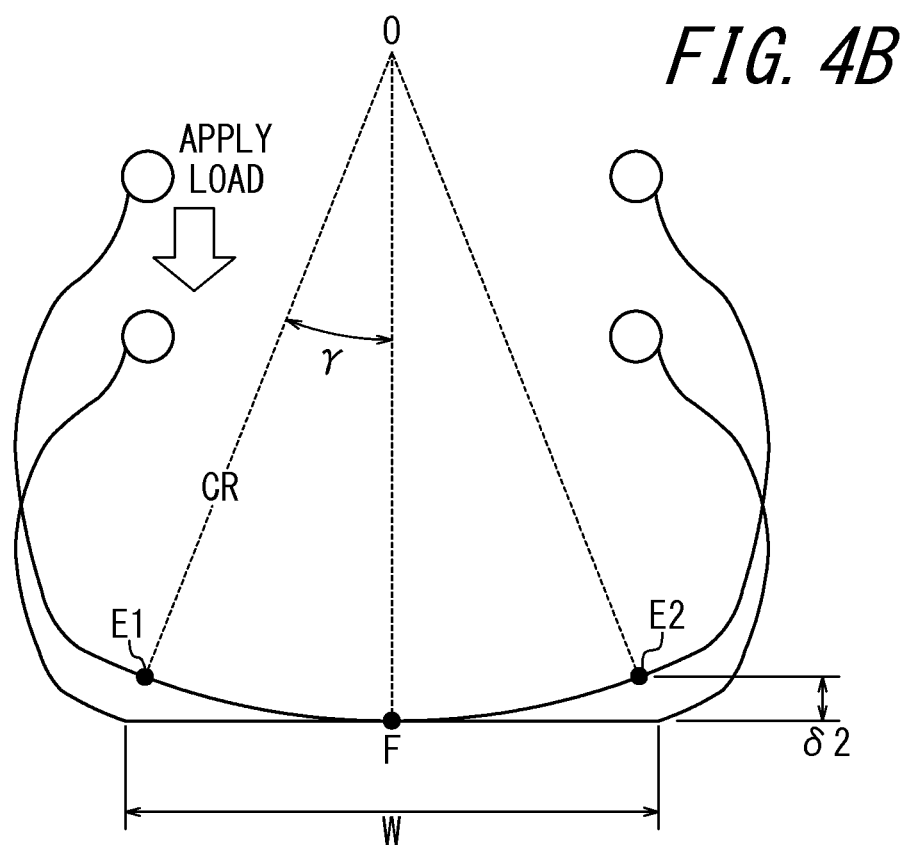

FIG. 4B is a cross-sectional view, in the tire width direction, of a ground contact surface of the tire. As shown in FIG. 4B, in the cross section in the tire width direction, the points E1 and E2 are ends that contact the ground when the maximum load, prescribed for each vehicle on which the tire is fitted, is applied. The point F is the center point in the width direction, and the width W (mm) is the ground contact width in the width direction. Further, under no load, the crown radius CR (mm) is a radius based on the points E1 and E2 obtained when the curve containing the three points E1, E2, and F, in the cross section in the width direction, is approximated as a circular arc. The center O is the center of the circle. The angle $\gamma(°)$ is an angle formed between the segment OE1 and the equatorial plane of the tire, in the cross section in the width direction. The deflection amount $\delta 2$ (mm) (or specifically the radial deflection amount of the ground contact end in the width direction) caused due to the application of the maximum load, specified for each vehicle on which the above tires are fitted, can be geometrically expressed by the following two expressions in terms of approximation:

$$\delta 2 = CR \times (1 - \cos \gamma) \qquad \text{Expression 4:}$$

$$\gamma \approx \tan^{-1}\{(W/2)/CR\} \approx W/2CR \qquad \text{Expression 5:}$$

Figure 5:
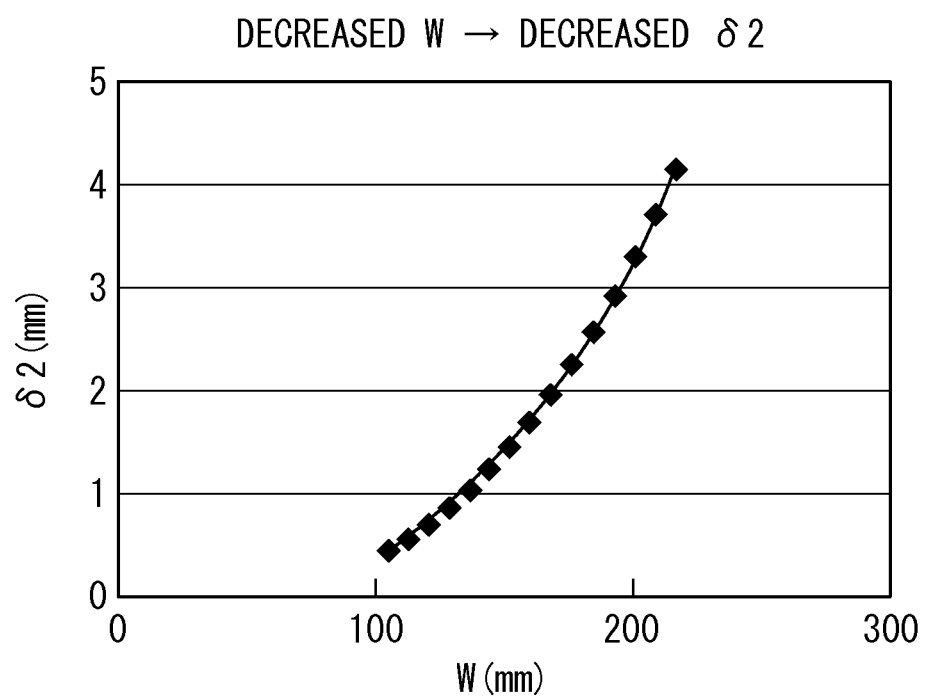
FIG. 5 is a diagram showing the relationships between a ground contact width W and a deflection amount δ2.

FIG. 5 is a diagram showing the relationships between the ground contact width W and the deflection amount $\delta 2$ of conventional tires of various sizes that are fitted on an applicable rim, prepared to have a prescribed internal pressure, and subjected to a maximum load. The above expressions 4 and 5, and FIG. 5 demonstrate that reduction in the ground contact width W reduces the deflection amount $\delta 2$. This means that reducing the tire width is an effective way to reduce the rolling resistance of a tire from the perspective of suppressing the shear deformation of the tread rubber in the tire width direction. Reducing the tire width also effectively reduces the tire weight. The foregoing has demonstrated that by suitably controlling the increase in the diameter and the decrease in the width, reduction in the tire rolling resistance value can be achieved simultaneously with reduction in the tire weight.

Figure 6:
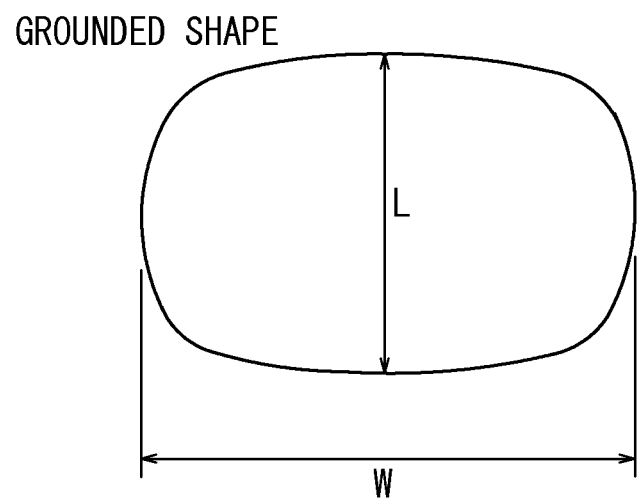
FIG. 6 is a diagram for illustrating the relationships among a load, an internal pressure, and a ground contact area.

In FIG. 6, the ground contact length of a tire is denoted as L, the ground contact width of the tire is denoted as W, the internal pressure of the tire is denoted as P, and the applied load to the tire is denoted as Lo. The ground contact surface of the tire and the applied load have the relationships approximated by the following expression, which is obtained from equilibrium condition of force.

$$Lo \approx W \times L \times P \qquad \text{Expression 6:}$$

Thus, with a constant applied load and an internal pressure of a tire, when the tire ground contact width W is reduced to suppress the above-mentioned shear deformation of the tread rubber in the width direction and to reduce the tire weight, the ground contact length L will be increased as expressed by the balance relational expression shown in expression 6. With this and the above expressions 1 and 2, it has been newly found that an increase in the deflection amount $\delta 1$, which is caused by an increase in the ground contact length L, increases the shear deformation of the tread rubber in the tire circumference direction.

Figure 7A:
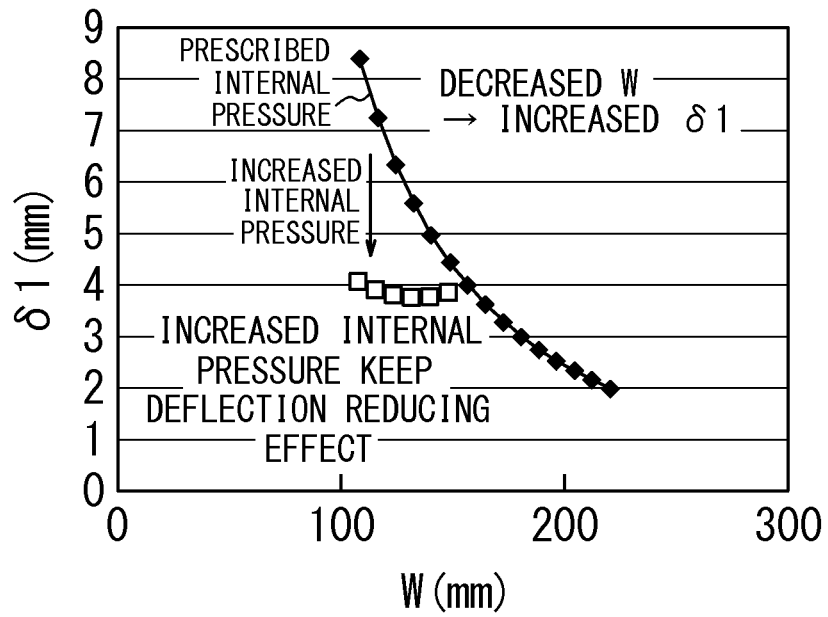
FIG. 7A is a diagram showing the deflection amount δ1 for the tire with an increased internal pressure.
Figure 7B:
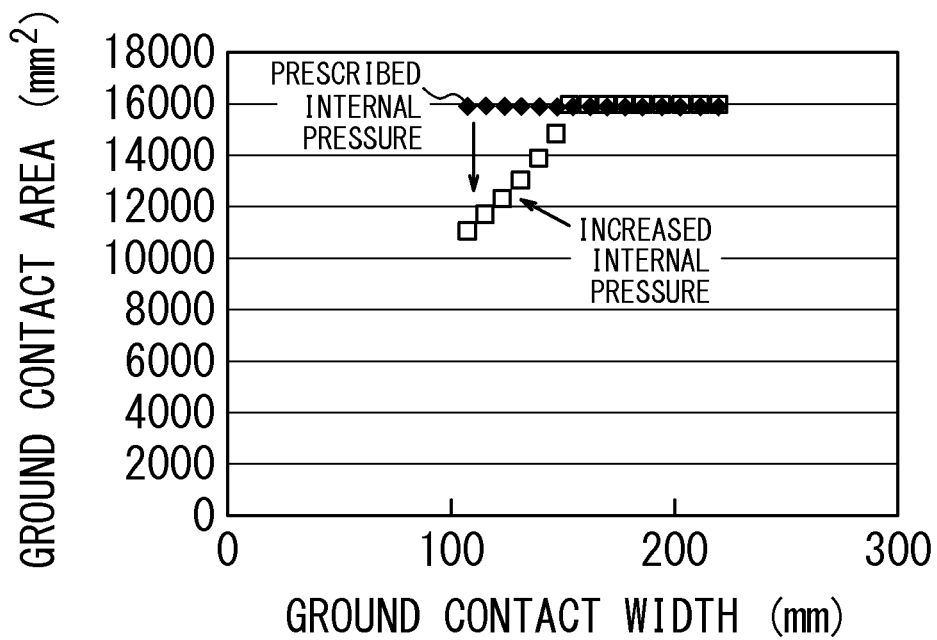
FIG. 7B is a diagram showing the ground contact area for the tire with an increased internal pressure.

The inventor has then found that the use of a tire prepared to have a high internal pressure effectively suppresses the increase in the ground contact length even with a reduction in the tire width. Specifically, in accordance with the relationships shown by the above expression 6, even if the ground contact width is reduced, by using a tire prepared to have a high internal pressure, the applied load can be supported without reducing the ground contact length. FIG. 7A is a diagram showing the relationships between the ground contact width W and the deflection amount $\delta 1$ of a tire having a tire size of 195/65R15 that is fitted on an applicable rim and subjected to a maximum load. FIG. 7B is a diagram showing the relationships between the ground contact width W and the ground contact area of a tire having a tire size of 195/65R15 that is fitted on an applicable rim and subjected to a maximum load. As shown in FIG. 7A, when the tire with a prescribed internal pressure is used, a decrease in the ground contact width results in an increase in the deflection amount $\delta 1$. This reduces the suppressing effect of the circumferential shear deformation of the tread rubber. Also, as shown in FIG. 7B, when the tire with a prescribed internal pressured is used, a decrease in the tread width wound not make any substantial change in the ground contact area, resulting in an increase in the ground contact length. In contrast, with a tire having a high internal pressure, a decrease in the ground contact width does not increase the deflection amount as shown in FIG. 7A, and a reduction in the ground contact width reduces the ground contact area as shown in FIG. 7B. These allow suppression of the shear deformation of the tread rubber, caused due to the ground contact of a tire, both in the circumference direction and width direction. Therefore, the rolling resistance value of the tire can be reduced.

Figure 8A:
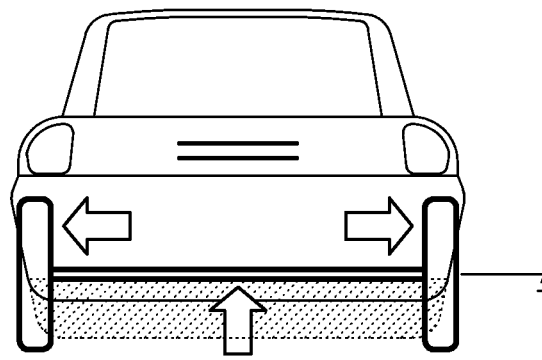
FIGS. 8A and 8B are diagrams for illustrating an increased space of a vehicle resulting from increased diameter and smaller width of a tire.
Figure 8B:
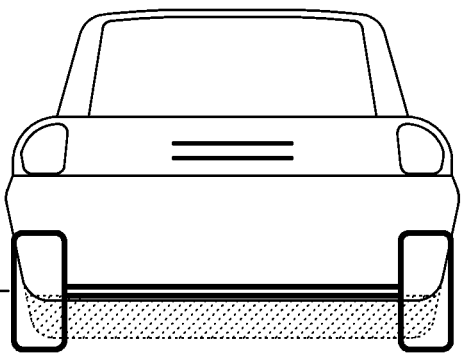

Furthermore, as shown in FIGS. 8A and 8B, reducing the tire width allows vehicle space to be secured, and in particular, space for installing drive components to be secured between opposite tires in the vicinity of portions where tires are fitted. Moreover, since an increase in the diameter of a radial tire raises a wheel shaft to a higher position and increases the space under the floor, space for a trunk of a vehicle and the like, and space for installing drive components can be secured.

On the basis of the above findings, the inventor pursued specific conditions of a tire associated with an increased diameter, a reduced width, and an increased internal pressure, with which a reduction in tire rolling resistance value and a reduction in tire weight can be both ensured. First, Reference tire 1 having a tire size of 195/65R15 was prepared as a tire providing the criteria, which is used in vehicles for most general-purpose and suitable for comparing the performance of tires. Tires of various sizes were also prepared and fitted on a rim having a width corresponding to the bead width of each tire. The following tests were then conducted on the tires prepared to have an internal pressure of 220 kPa and prepared to have a high internal pressure. Table 1 shows specifications of each tire. Any specification not shown in Table 1, such as an inner structure of tire, is similar to that of common tires. Each tire includes a carcass composed of plies of radially arranged cords toroidally extending between a pair of bead portions. A wide variety of tire sizes including irregular tire sizes that deviate from conventional standards such as JATMA (Japanese standards for tires), TRA (U.S. tire standards), and ETRTO (European tire standards) were tried without adhering to the standards. In particular, Sample tires 27 to 33 having a tire section width SW of 175 (mm) or greater were also experimentally produced as tires intended for use with sporty-type vehicles. Sample tires 27 to 33 were compared with a tire having a tire size of 225/45R17 (Reference tire 2), whose wheel sizes had been increased based on the tire having a tire size of 195/65R15 (Reference tire 1).

TABLE 1

|  |  | Tire size | SW/OD ratio |
|---|---|---|---|
| Conventional tire | Conventional tire 1 | 145/70R12 | 0.29 |
|  | Conventional tire 2 | 155/55R14 | 0.29 |
|  | Conventional tire 3 | 165/60R14 | 0.30 |
|  | Conventional tire 4 | 175/65R14 | 0.30 |
|  | Conventional tire 5 | 185/60R15 | 0.31 |
|  | Reference tire 1 | 195/65R15 | 0.31 |
|  | Conventional tire 6 | 205/55R16 | 0.32 |
|  | Conventional tire 7 | 215/60R16 | 0.32 |
|  | Conventional tire 8 | 225/55R17 | 0.33 |
|  | Conventional tire 9 | 245/45R18 | 0.36 |
|  | Conventional tire 10 | 155/65R13 | 0.29 |
|  | Reference tire 2 | 225/45R17 | 0.35 |
| Sample tire | Sample tire 1 | 165/65R19 | 0.24 |
|  | Sample tire 2 | 155/65R18 | 0.24 |
|  | Sample tire 3 | 145/65R19 | 0.22 |
|  | Sample tire 4 | 135/65R19 | 0.21 |
|  | Sample tire 5 | 125/65R19 | 0.19 |
|  | Sample tire 6 | 175/55R22 | 0.23 |
|  | Sample tire 7 | 165/55R20 | 0.24 |
|  | Sample tire 8 | 155/55R19 | 0.24 |
|  | Sample tire 9 | 145/55R20 | 0.22 |
|  | Sample tire 10 | 135/55R20 | 0.21 |
|  | Sample tire 11 | 125/55R20 | 0.19 |
|  | Sample tire 12 | 175/45R23 | 0.24 |
|  | Sample tire 13 | 165/45R22 | 0.23 |
|  | Sample tire 14 | 155/45R21 | 0.23 |
|  | Sample tire 15 | 145/45R21 | 0.22 |
|  | Sample tire 16 | 135/45R21 | 0.21 |
|  | Sample tire 17 | 145/60R16 | 0.25 |

TABLE 1-continued

|  | Tire size | SW/OD ratio |
|---|---|---|
| Sample tire 18 | 155/60R17 | 0.25 |
| Sample tire 19 | 165/55R19 | 0.25 |
| Sample tire 20 | 155/45R18 | 0.26 |
| Sample tire 21 | 165/55R18 | 0.26 |
| Sample tire 22 | 175/55R19 | 0.26 |
| Sample tire 23 | 115/50R17 | 0.21 |
| Sample tire 24 | 105/50R16 | 0.21 |
| Sample tire 25 | 135/60R17 | 0.23 |
| Sample tire 26 | 185/60R20 | 0.25 |
| Sample tire 27 | 185/50R20 | 0.27 |
| Sample tire 28 | 195/60R19 | 0.27 |
| Sample tire 29 | 175/60R18 | 0.26 |
| Sample tire 30 | 195/55R20 | 0.27 |
| Sample tire 31 | 215/50R21 | 0.29 |
| Sample tire 32 | 205/55R20 | 0.28 |
| Sample tire 33 | 185/45R22 | 0.26 |

<Rolling Resistance (RR Value)>

Each of the above tires was fitted on a rim with a width corresponding to the bead width of the tire to be formed into a tire and rim assembly, which was then subjected to a maximum load specified for each vehicle on which the tire is fitted. The rolling resistance of the each tire was then measured under the condition of drum rotation speed of 100 km/h. The evaluation result are shown with indices based on the RR value of Reference tire 1 being 100. Smaller index values imply lower rolling resistance.

<Tire Weight>

The weight of each tire was measured and the tire weight was represented by indices based on the mass of Reference tire 1 being 100 (lighter as the value is smaller). In the following, the evaluation results are shown in Tables 2 and 3, and further results based thereon are shown in FIGS. 10 to 13.

TABLE 2

|  | 220 kPa | RR value (INDEX) | Internal pressure (kPa) | W (mm) | L (mm) | OD (mm) | δ1 (mm) | Tire weight (INDEX) |
|---|---|---|---|---|---|---|---|---|
| Conventional tire | Conventional tire 1 | 120 | 220 | 111.65 | 162.8 | 507.8 | 12.1 | 61.3 |
|  | Conventional tire 2 | 125 | 220 | 119.35 | 152.3 | 526.1 | 10.4 | 61.9 |
|  | Conventional tire 3 | 118 | 220 | 127.05 | 143.1 | 553.6 | 8.8 | 71.6 |
|  | Conventional tire 4 | 109 | 220 | 134.75 | 134.9 | 583.1 | 7.5 | 82.5 |
|  | Conventional tire 5 | 106 | 220 | 142.45 | 127.6 | 603 | 6.5 | 87.4 |
|  | Reference tire 1 | 100 | 220 | 150.15 | 121.1 | 634.5 | 5.6 | 100 |
|  | Conventional tire 6 | 101 | 220 | 157.85 | 115.2 | 631.9 | 5.1 | 98.3 |
|  | Conventional tire 7 | 93 | 220 | 164.65 | 110.4 | 664.4 | 4.5 | 111.9 |
|  | Conventional tire 8 | 85 | 220 | 170.85 | 106.4 | 679.3 | 4.1 | 124.7 |
|  | Conventional tire 9 | 80 | 220 | 176.65 | 102.9 | 677.7 | 3.8 | 129.4 |
|  | Conventional tire 10 | 90 | 220 | 170.8 | 106.4 | 634.3 | 4.4 | 116.5 |
|  | Reference tire 2 | 90 | 220 | 170.8 | 106.5 | 634.3 | 4.37 | 116 |
| Sample tire | Sample tire 1 | 98.9 | 220 | 127.1 | 143.1 | 697.1 | 7.1 | 93 |
|  | Sample tire 2 | 106.7 | 220 | 119.4 | 152.3 | 658.7 | 8.5 | 82.5 |
|  | Sample tire 3 | 107.5 | 220 | 111.7 | 162.8 | 671.1 | 9.5 | 78.6 |
|  | Sample tire 4 | 111.7 | 220 | 104 | 174.9 | 658.1 | 11 | 71.8 |
|  | Sample tire 5 | 116 | 220 | 96.3 | 188.9 | 645.1 | 13 | 65.2 |
|  | Sample tire 6 | 88.3 | 220 | 134.8 | 134.9 | 751.3 | 5.9 | 99.7 |
|  | Sample tire 7 | 99.3 | 220 | 128.3 | 141.7 | 689.5 | 7.1 | 86.3 |

TABLE 2-continued

|  | 220 kPa | RR value (INDEX) | Internal pressure (kPa) | W (mm) | L (mm) | OD (mm) | δ1 (mm) | Tire weight (INDEX) |
|---|---|---|---|---|---|---|---|---|
|  | Sample tire 8 | 106.8 | 220 | 120.5 | 150.8 | 653.1 | 8.4 | 76.8 |
|  | Sample tire 9 | 107.4 | 220 | 112.8 | 161.2 | 667.5 | 9.3 | 73.4 |
|  | Sample tire 10 | 111.4 | 220 | 105 | 173.2 | 656.5 | 10.9 | 67.2 |
|  | Sample tire 11 | 115.4 | 220 | 97.2 | 187 | 645.5 | 12.8 | 61.2 |
|  | Sample tire 12 | 89 | 220 | 136.1 | 133.6 | 741.7 | 5.9 | 92 |
|  | Sample tire 13 | 96.3 | 220 | 129.6 | 140.3 | 707.3 | 6.8 | 82.7 |
|  | Sample tire 14 | 103.5 | 220 | 121.7 | 149.3 | 672.9 | 8 | 73.9 |
|  | Sample tire 15 | 107.2 | 220 | 113.9 | 159.6 | 663.9 | 9.2 | 68.2 |
|  | Sample tire 16 | 111 | 220 | 106 | 171.5 | 654.9 | 10.7 | 62.7 |
|  | Sample tire 17 | 102.7 | 220 | 114.6 | 158.7 | 580.4 | 10.2 | 65.9 |
|  | Sample tire 18 | 100.1 | 220 | 122.5 | 148.4 | 617.8 | 8.5 | 75 |
|  | Sample tire 19 | 94.2 | 220 | 130.4 | 139.4 | 664.1 | 7 | 83.1 |
|  | Sample tire 20 | 105 | 220 | 122.5 | 148.4 | 596.7 | 8.8 | 65.5 |
|  | Sample tire 21 | 96.2 | 220 | 130.4 | 139.4 | 638.7 | 7.3 | 79.9 |
|  | Sample tire 22 | 93.6 | 220 | 131.3 | 138.5 | 675.1 | 6.2 | 89.6 |
|  | Sample tire 23 | 118 | 220 | 92.0 | 197.6 | 546.8 | 16.3 | 48.2 |
|  | Sample tire 24 | 120 | 220 | 89.3 | 203.7 | 511.4 | 18.2 | 41.2 |
|  | Sample tire 25 | 113 | 220 | 108.0 | 168.3 | 593.8 | 11.3 | 65.9 |
|  | Sample tire 26 | 102 | 220 | 138.8 | 131.0 | 730 | 5.7 | 109.4 |
|  | Sample tire 27 | 89.2 | 220 | 138.8 | 131.0 | 693.0 | 6.0 | 104.7 |
|  | Sample tire 28 | 90.9 | 220 | 146.3 | 124.3 | 716.6 | 5.3 | 109.5 |
|  | Sample tire 29 | 92.9 | 220 | 131.3 | 138.5 | 667.2 | 7.0 | 102.4 |
|  | Sample tire 30 | 95.8 | 220 | 136.5 | 133.2 | 722.5 | 6.0 | 106.9 |
|  | Sample tire 31 | 81.9 | 220 | 150.5 | 120.8 | 748.4 | 4.8 | 114.1 |
|  | Sample tire 32 | 85.4 | 220 | 143.5 | 126.7 | 733.5 | 5.4 | 112.0 |
|  | Sample tire 33 | 91.4 | 220 | 131.3 | 138.5 | 716.3 | 6.5 | 102.0 |

TABLE 3

|  | High internal pressure | RR Value (INDEX) | Internal pressure (kPa) | W (mm) | L (mm) | OD (mm) | δ1 (mm) | Tire weight (INDEX) |
|---|---|---|---|---|---|---|---|---|
| Conventional tire | Conventional tire 1 | 108 | 295 | 111.7 | 121.4 | 507.8 | 7 | 61.3 |
|  | Conventional tire 2 | 111.3 | 275 | 119.4 | 121.9 | 526.1 | 6.8 | 61.9 |
|  | Conventional tire 3 | 108.6 | 260 | 127.1 | 121.1 | 553.6 | 6.4 | 71.6 |
|  | Conventional tire 4 | 103.6 | 245 | 134.8 | 121.2 | 583.1 | 6.1 | 82.5 |
|  | Conventional tire 5 | 103.9 | 230 | 142.5 | 122.1 | 603 | 6 | 87.4 |
|  | Reference tire 1 | 100 | 220 | 150.2 | 121.1 | 634.5 | 5.6 | 100 |
|  | Conventional tire 6 | 101 | 220 | 157.9 | 115.2 | 631.9 | 5.1 | 98.3 |
|  | Conventional tire 7 | 93 | 220 | 164.7 | 110.4 | 664.4 | 4.5 | 111.9 |
|  | Conventional tire 8 | 85 | 220 | 170.9 | 106.4 | 679.3 | 4.1 | 115.9 |
|  | Conventional tire 9 | 80 | 220 | 176.7 | 102.9 | 677.7 | 3.8 | 117.7 |
|  | Conventional tire 10 | 90 | 220 | 170.8 | 106.4 | 634.3 | 4.4 | 116.5 |
|  | Reference tire 2 | 90 | 220 | 170.8 | 106.5 | 634.3 | 4.37 | 116 |
| Sample tire | Sample tire 1 | 92.2 | 260 | 127.1 | 121.1 | 697.1 | 5.1 | 93 |
|  | Sample tire 2 | 96 | 275 | 119.4 | 120.6 | 658.7 | 5.4 | 82.5 |
|  | Sample tire 3 | 92.4 | 295 | 111.7 | 121.4 | 671.1 | 5.4 | 78.6 |
|  | Sample tire 4 | 91.6 | 315 | 104 | 121 | 658.1 | 5.4 | 71.8 |
|  | Sample tire 5 | 88.2 | 340 | 96.3 | 121.2 | 645.1 | 5.5 | 65.2 |
|  | Sample tire 6 | 84.8 | 345 | 134.8 | 120.7 | 751.3 | 4.8 | 99.7 |
|  | Sample tire 7 | 92.6 | 260 | 128.3 | 120.8 | 689.5 | 5.2 | 86.3 |
|  | Sample tire 8 | 96.2 | 275 | 120.5 | 121.1 | 653.1 | 5.5 | 76.8 |
|  | Sample tire 9 | 92.3 | 290 | 112.8 | 121.1 | 667.5 | 5.4 | 73.4 |
|  | Sample tire 10 | 92.4 | 310 | 105 | 121.7 | 656.5 | 5.5 | 67.2 |
|  | Sample tire 11 | 87.7 | 340 | 97.2 | 121 | 645.5 | 5.5 | 61.2 |
|  | Sample tire 12 | 85.5 | 250 | 136.1 | 120.9 | 741.7 | 4.8 | 92 |
|  | Sample tire 13 | 89.7 | 255 | 129.6 | 121 | 707.3 | 5.1 | 82.7 |
|  | Sample tire 14 | 93.2 | 270 | 121.7 | 121.2 | 672.9 | 5.3 | 73.9 |
|  | Sample tire 15 | 92.2 | 290 | 113.9 | 121.1 | 663.9 | 5.4 | 68.2 |
|  | Sample tire 16 | 92.1 | 310 | 106 | 121.3 | 654.9 | 5.5 | 62.7 |

TABLE 3-continued

| High internal pressure | RR Value (INDEX) | Internal pressure (kPa) | W (mm) | L (mm) | OD (mm) | δ1 (mm) | Tire weight (INDEX) |
|---|---|---|---|---|---|---|---|
| Sample tire 17 | 93.9 | 290 | 114.6 | 120.4 | 580.4 | 6 | 65.9 |
| Sample tire 18 | 92.1 | 270 | 122.5 | 120.9 | 617.8 | 5.7 | 75 |
| Sample tire 19 | 89.4 | 255 | 130.4 | 120.3 | 664.1 | 5.3 | 83.1 |
| Sample tire 20 | 92.1 | 270 | 122.5 | 120.9 | 596.7 | 5.9 | 65.5 |
| Sample tire 21 | 89.4 | 255 | 130.4 | 120.3 | 638.7 | 5.5 | 79.9 |
| Sample tire 22 | 88.7 | 250 | 131.3 | 121.9 | 675.1 | 5.3 | 89.6 |
| Sample tire 23 | 86.7 | 350 | 92.0 | 124.2 | 546.8 | 6.8 | 48.2 |
| Sample tire 24 | 94.1 | 350 | 89.3 | 128.0 | 511.4 | 7.66 | 41.2 |
| Sample tire 25 | 85.6 | 300 | 108.0 | 123.4 | 593.8 | 6.22 | 65.9 |
| Sample tire 26 | 73.0 | 270 | 138.8 | 106.7 | 730 | 3.84 | 109.4 |
| Sample tire 27 | 80.0 | 270 | 104.7 | 106.8 | 693.0 | 4.0 | 104.7 |
| Sample tire 28 | 81.3 | 258 | 109.5 | 106.0 | 716.6 | 3.9 | 109.5 |
| Sample tire 29 | 84.7 | 286 | 102.4 | 106.6 | 667.2 | 4.2 | 102.4 |
| Sample tire 30 | 83.3 | 277 | 106.9 | 105.8 | 722.5 | 3.8 | 106.9 |
| Sample tire 31 | 75.0 | 250 | 114.1 | 106.3 | 748.4 | 3.7 | 114.1 |
| Sample tire 32 | 78.7 | 263 | 112.0 | 106.0 | 733.5 | 3.8 | 112.0 |
| Sample tire 33 | 86.7 | 285 | 100.0 | 106.9 | 716.3 | 3.9 | 102.0 |

For Sample tires 8, 15, 20, and 31, further testing was conducted to evaluate the tire rolling resistance values under various internal pressure conditions using the above-described method. The evaluation results are shown in Table 4 and FIG. 9.

TABLE 4

| Internal pressure (kPa) | Tire size | | | |
|---|---|---|---|---|
| | 145/45R21 | 155/55R19 | 155/45R18 | 215/50R21 |
| | RR value (INDEX) | | | |
| 220 | 106.8 | 107.2 | 105 | 102 |
| 250 | 99 | 99 | 97 | 95 |
| 280 | 96 | 93 | 91 | 88 |
| 310 | 91.8 | 88.5 | 87 | 84 |
| 340 | 88 | 85 | 84 | 81 |
| 400 | 83 | 79 | 79 | 77 |

Figure 10A:
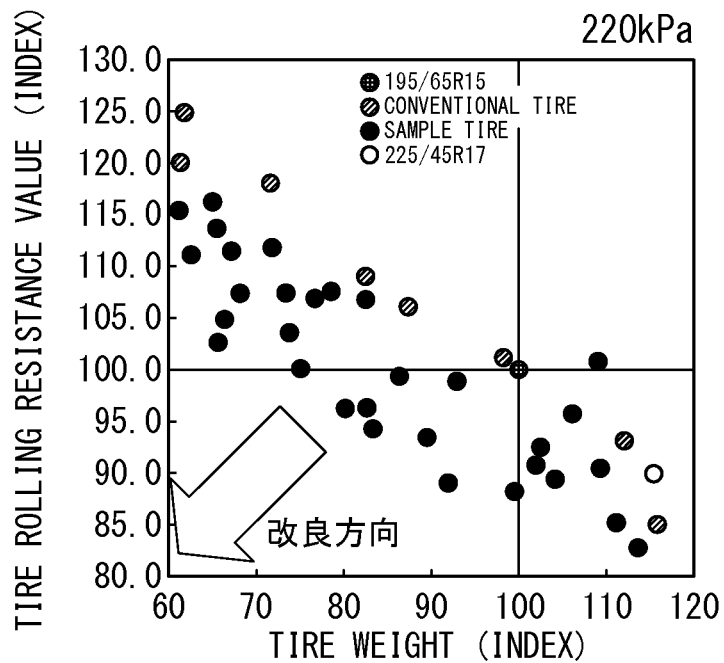
FIGS. 10A and 10B are diagrams showing the tire weight and the rolling resistance value of each tire.
Figure 10B:
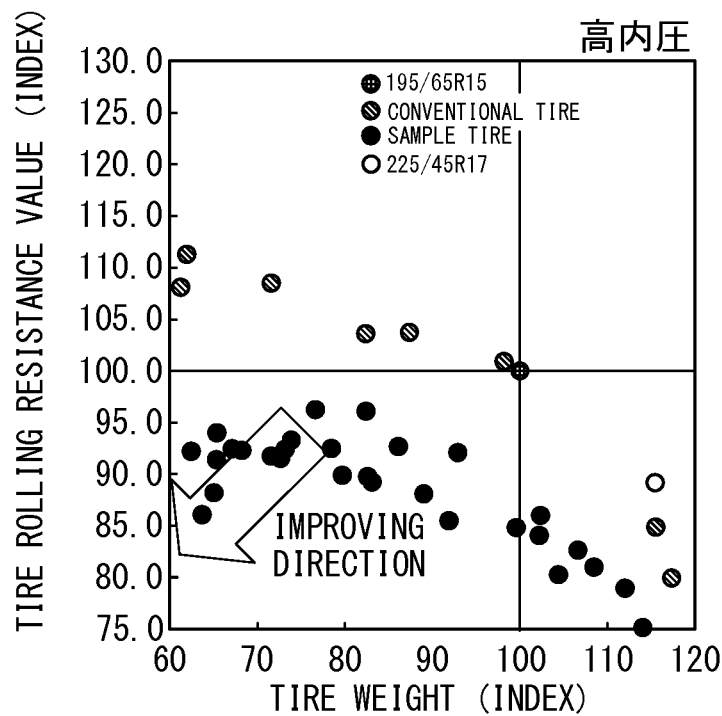

Tables 2 to 4 and FIGS. 9, 10A, and 10B demonstrate that by using Sample tires 1 to 26 that are prepared to have an internal pressure of 250 kPa or higher, both the tire rolling resistance value and the tire weight can be reduced as compared with Reference tire 1. The results further demonstrate that by using Sample tires 27 to 33 that are prepared to have an internal pressure of 250 kPa or higher, both the tire rolling resistance value and the tire weight can be reduced as compared with Reference tire 2. In this regard, the internal pressure is preferably no higher than 350 kPa.

The inventor then made further investigation to find out a specific tire size of Sample tires 1 to 33 that allows reduction in both of tire rolling resistance value and tire weight. FIGS. 14A and 14B are diagrams showing the relationships between the section width SW (mm) and the outer diameter OD (mm) for sample tires and conventional tires. As shown in FIG. 14A, when the section width SW is smaller than 165 (mm), the SW/OD ratio of the Samples tire is 0.26 or less. This means that a tire having the SW/OD ratio of 0.26 or less when prepared to have an internal pressure of 250 kPa or higher can achieve reduction in both tire rolling resistance value and tire weight. As shown in FIG. 14A, when the section width SW is 165 (mm) or greater, the section width SW and the outer diameter OD of the sample tires satisfy the following relational expression:

$$OD \geq 2.135 \times SW + 282.3$$

This means that a tire with a section width SW of 165 (mm) or greater, which satisfies the above relational expression when prepared to have an internal pressure of 250 kPa or higher, can achieve reduction in both of tire rolling resistance value and tire weight.

As shown in FIG. 14B, fitting is performed, with a quadratic curve, on the boundary defining a tire size that enables reduction in both of the tire rolling resistance value and the tire weight for both types of tires having an SW of less than 165 (mm) and an SW of 165 (mm) or greater. From this, it has been found that a tire satisfying the following relational expression can reduce both of tire rolling resistance value and tire weight:

$$OD \geq -0.0187 \times SW^2 + 9.15 \times SW - 380$$

To reduce both of the tire rolling resistance value and the tire weight, it is preferred that SW/OD≤0.26 be satisfied, and it is particularly preferred that SW/OD≤0.24 be satisfied.

Figure 11A:
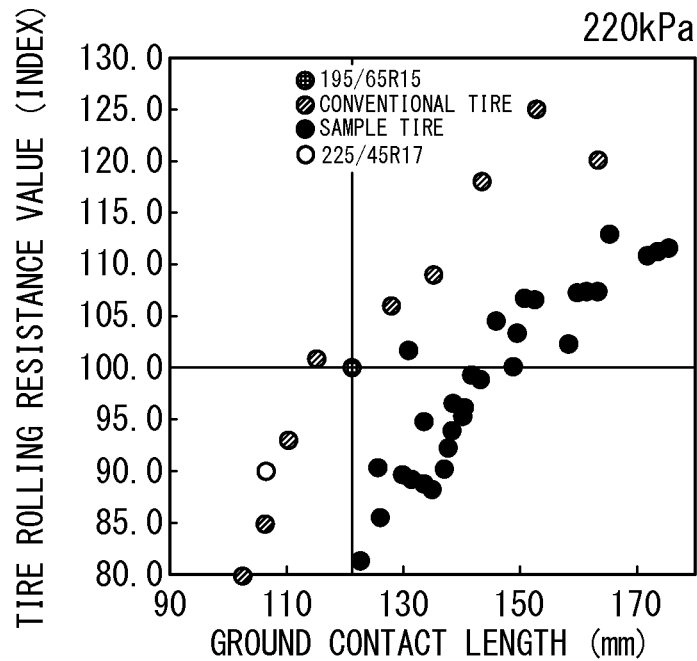
FIGS. 11A and 11B are diagrams showing the ground contact length and the rolling resistance value of each tire.
Figure 11B:
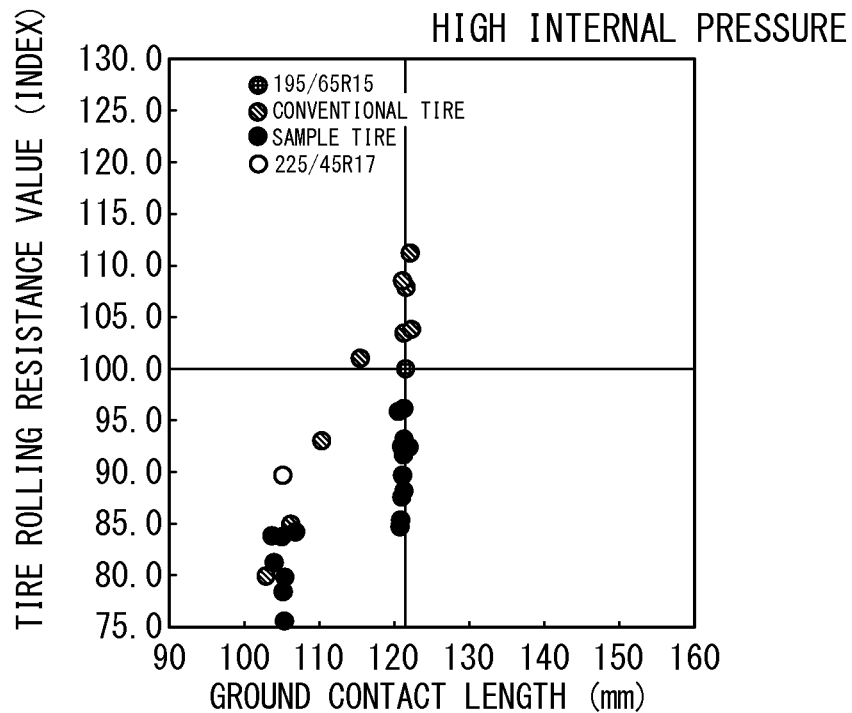
Figure 12A:
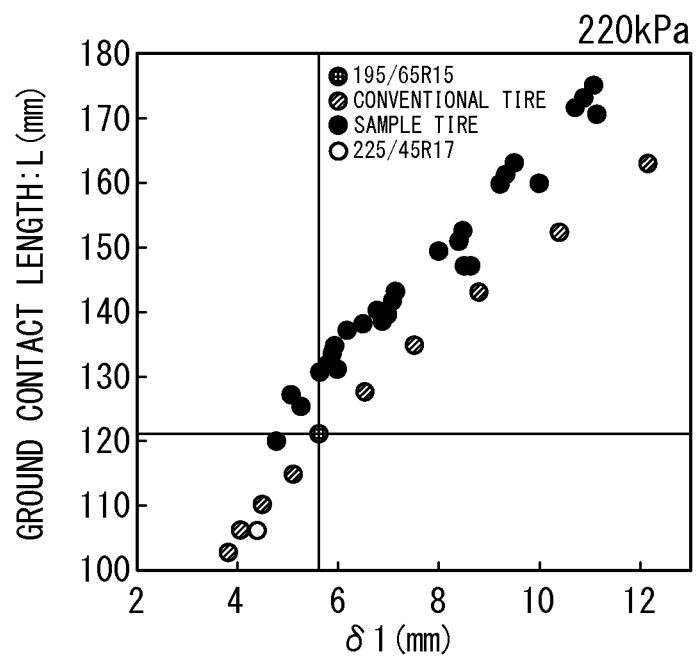
FIGS. 12A and 12B are diagrams showing the deflection amount δ1 and the ground contact length of each tire.
Figure 12B:
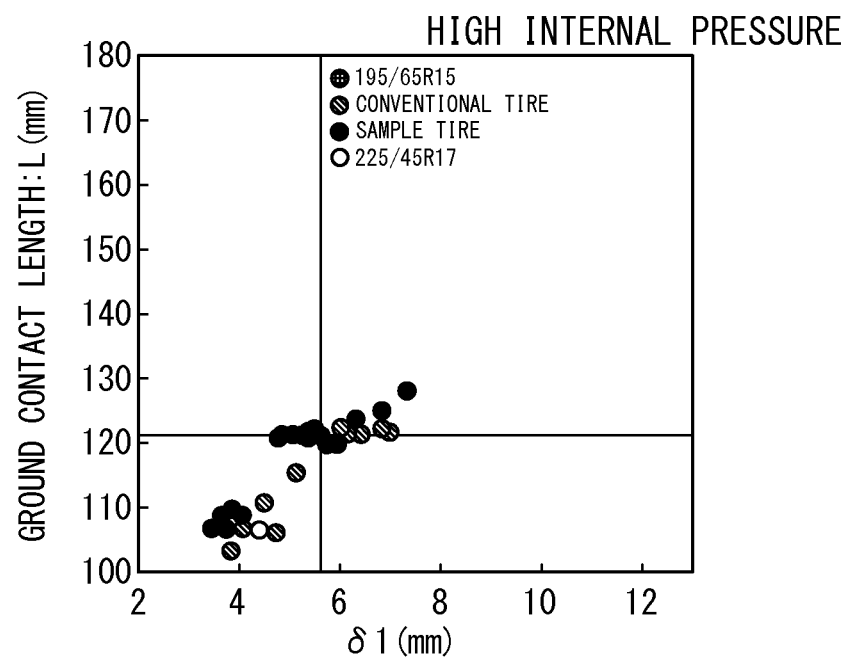
Figure 13:
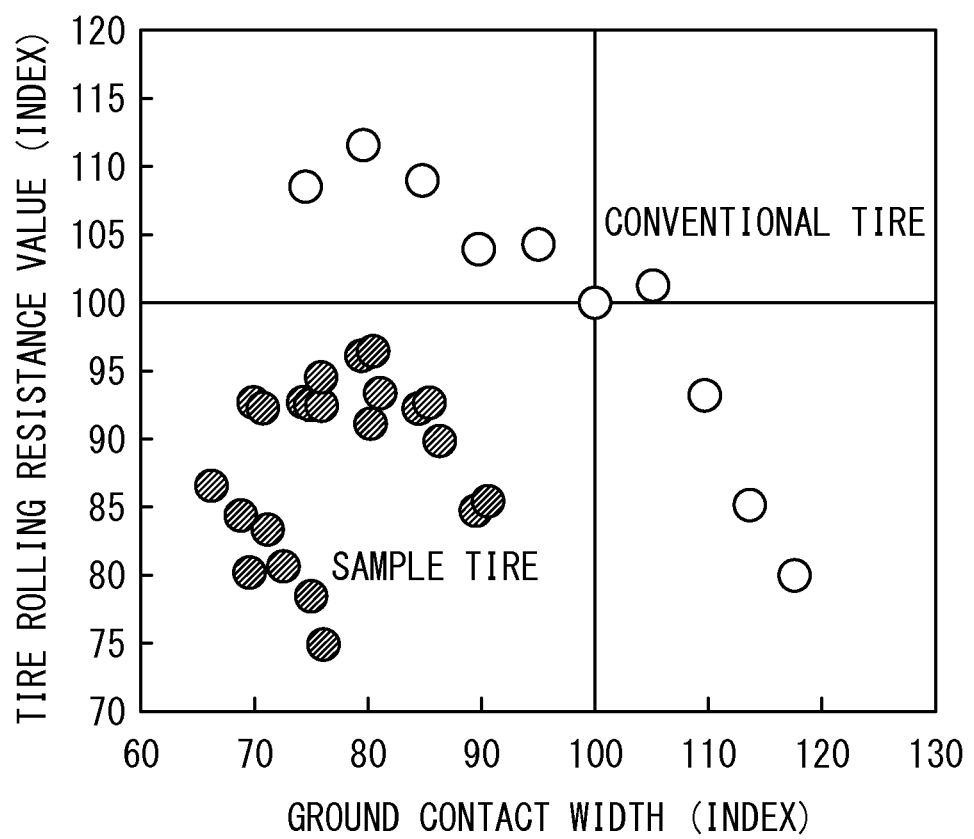
FIG. 13 is a diagram showing the relationships between the ground contact width and the rolling resistance value of each tire.

Moreover, Tables 2 and 3, and FIGS. 11A and 11B demonstrate that a tire with an increased internal pressure can suppress an increase in the ground contact length caused by a decreased ground contact width, so that the ground contact length can be made substantially the same as the ground contact length of the reference tire. Further, as shown in Table 2 and FIG. 12A, when the internal pressure is 220 kPa, a reduction in the ground contact width increases the ground contact length to cause an increase in the deflection amount δ1. Compared to this, as shown in Table 2 and FIG. 12B, a tire with an increased internal pressure can suppress an increase in the ground contact length so that the deflection amount δ1 can be reduced. Therefore, as shown in Table 3 and FIG. 13, with a tire having a ground contact width of 150 mm or less when the size of the tire satisfies the relation SW/OD≤0.26 (SW<165 (mm)) regarding the section width SW and the outer diameter OD of the tire, and fitting the tire on a rim having a width corresponding to the bead width of the tire and applying a maximum load prescribed for each vehicle on which the tire is fitted, a reduction in tire rolling resistance value and a reduction in tire weight can be both ensured. Also, with a tire having a ground contact width of 175 mm or less when the size of the tire satisfies the relation OD≥2.135×SW+282.3 (SW≥165 (mm)), and the fitting the tire on a rim having a width corresponding to the bead width of the tire and applying a maximum load prescribed for each vehicle on which the tire is fitted, a reduction in tire rolling resistance value and a reduction in tire weight can be both ensured. Alternatively, with a tire having a ground contact width of 175 mm or less when the size of the tire satisfies the relation OD≥−0.0187×SW²+9.15×SW−380, and fitting the tire on a rim having a width corresponding to the bead width of the tire and applying a maximum load prescribed for each vehicle on which the tire is fitted, a reduction in tire rolling resistance value and a reduction in tire weight can be both ensured. In FIG. 13, the ground contact width is represented by indices based on the ground contact width of 150 mm being 100. Smaller index values imply smaller ground contact width. The preferred ground contact width is no shorter than 90 mm to secure the axial force of the tire to increase the stability and safety of the vehicle. The preferred ground contact length is 90 to 140 mm.

When a tire having a size, regarding the section width SW and the outer diameter OD of a tire, satisfying SW/OD≤0.26 (SW<165 (mm)) and OD≥2.135×SW+282.3 (SW≥165 (mm)) for the boundary expressed by a linear expression, or satisfying OD≥−0.0187×SW²+9.15×SW−380 for the boundary expressed by a quadratic expression, is subjected to a maximum load prescribed for each vehicle on which the tire is fitted, the tire preferably has a ground contact area of no more than 16000 mm². With such ground contact areas, a reduction of tire rolling resistance value and tire weight can be both ensured. To increase the stability and safety of a vehicle by securing the axial force of the tire, the above ground contact area is preferably no smaller than 10000 mm².

To observe the effects produced by the increased internal pressure, tires of further various sizes are tested to evaluate rolling resistance value and tire weight with varied internal pressures. The specifications of each tire and the evaluation results are shown in Table 5 and FIG. 15.

TABLE 5

|  | Tire size | Internal pressure (kPa) | RR value (INDEX) | Tire weight (INDEX) |
| --- | --- | --- | --- | --- |
| Conventional tire | 145/70R12 | 220 | 120 | 45 |
|  | 155/55R14 | 220 | 125 | 49 |
|  | 165/60R14 | 220 | 118 | 61 |
|  | 175/65R14 | 220 | 109 | 74 |
|  | 185/60R15 | 220 | 106 | 83 |
|  | 195/65R15 | 220 | 100 | 100 |
|  | 205/55R16 | 220 | 101 | 101 |
|  | 215/55R17 | 220 | 93 | 121 |
|  | 225/55R17 | 220 | 85 | 131 |
|  | 245/45R18 | 220 | 80 | 136 |
|  | 225/45R17 | 220 | 90 | 116.5 |
| Tire with internal pressure that allows the same deflection amount δ1 | 145/70R19 | 265 | 92.5 | 79 |
|  | 155/55R20 | 256 | 93.8 | 75 |
|  | 165/60R20 | 250 | 95.1 | 93 |
|  | 175/60R19 | 250 | 93.2 | 92 |
| Tire with increased internal pressure (Case 1) | 145/70R19 | 270 | 90.7 | 79 |
|  | 155/55R20 | 270 | 88.9 | 75 |
|  | 165/60R20 | 270 | 87 | 93 |
|  | 175/60R19 | 270 | 85.5 | 92 |
| Tire with increased internal pressure (Case 2) | 145/70R19 | 320 | 76.6 | 79 |
|  | 155/55R20 | 320 | 75 | 75 |
|  | 165/60R20 | 320 | 73.4 | 93 |
|  | 175/60R19 | 320 | 72.9 | 92 |

Figure 15:
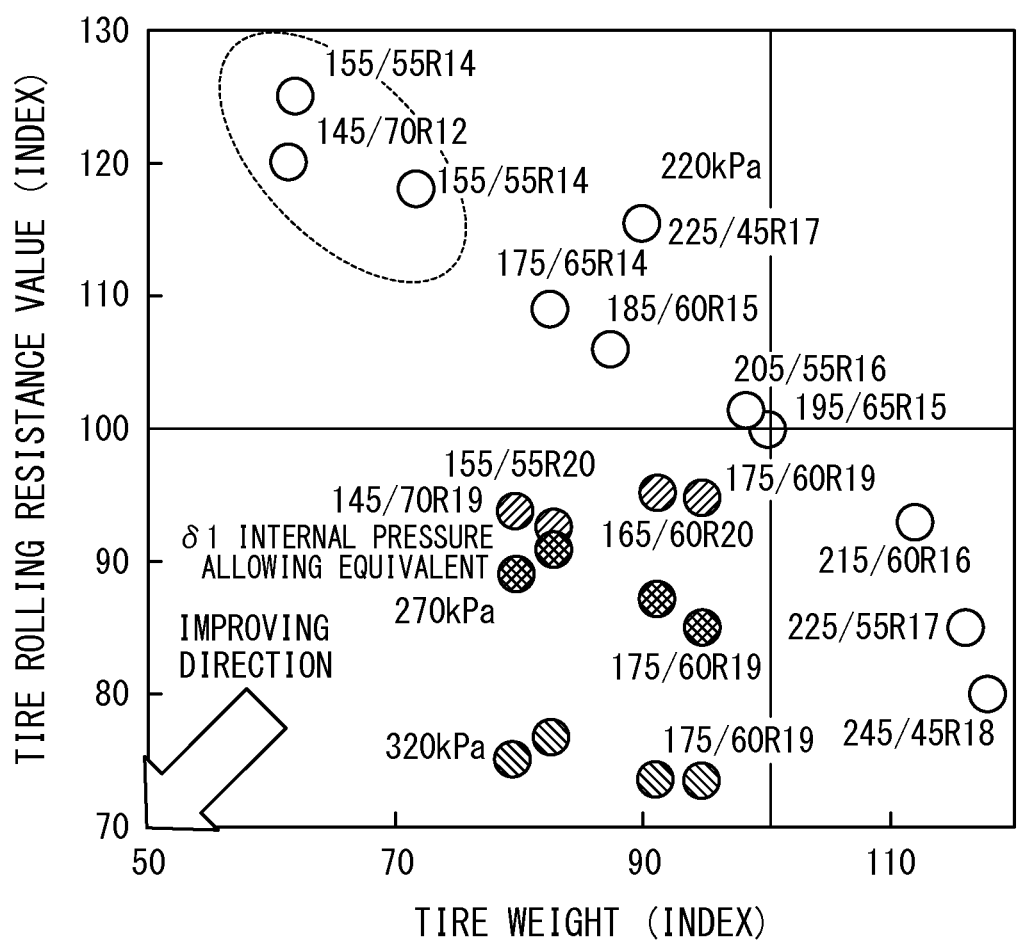
FIG. 15 is a diagram showing the tire weight and the rolling resistance value of each tire.

From Table 5 and FIG. 15, it is found that by using a tire having a size satisfying SW/OD≤0.26(SW<165 (mm)) and OD≥2.135×SW+282.3(SW≥165 (mm))

(hereinafter occasionally referred to as "Expression A") for the boundary expressed by a linear expression, or satisfying

OD≥−0.0187×SW²+9.15×SW−380

(hereinafter occasionally referred to as "Expression B") for the boundary expressed by a quadratic expression, which is prepared to have a high internal pressure that would allow equivalent deflection amount δ1 even with a reduced ground contact width, the tire rolling resistance value and the tire weight can be reduced. It is further found that by using a tire having a size satisfying Expression A or Expression B prepared to have an internal pressure of 270 kPa or higher, the rolling resistance value can be significantly reduced; and by using a tire having such a size prepared to have an internal pressure of 320 kPa or higher, the rolling resistance value can be further significantly reduced.

Here, the preferred tire structure for using tires under a high internal pressure condition of 250 kPa or higher will be described. First, the carcass preferably has a high turn-up structure in which the edges of at least one carcass ply are positioned radially further outward than the portion where the tire has a maximum width. It is further desired that the carcass has what is called an envelope structure in which the edges of at least one carcass ply are positioned radially between the carcass and the belt. A belt having high rigidity is preferably used. Specifically, a belt with a belt cord having a Young's modulus of 45000 MPa or higher is preferred. By optimizing the carcass structure and the rigidity of the belt as above, a tire having a strength that can withstand high internal pressure can be provided. The inner liner of the tire preferably has a thickness of 0.6 mm or greater. With such an inner liner, air leak can be suppressed under high internal pressure condition.

The inventor then made intensive studies to solve the above-mentioned problems associated with silent performance, which are unique to the tire having small width, large diameter, and high internal pressure, and have found a tread pattern of a tire that can solve the problems. The following thus describes a tire tread pattern for the above-described pneumatic radial tires for passenger vehicles with small width, large diameter, and high internal pressure, which ensures both the rolling resistance performance and the silent performance.

FIG. 16 is a development view illustrating a tread of a tire in accordance with one embodiment of the disclosure. The tire is a pneumatic radial tire for passenger vehicles with a small width and a large diameter, which satisfies the above Expression A or B when prepared to have an internal pressure of 250 kPa or higher. The tire includes a carcass composed of plies of radially arranged cords toroidally extending between a pair of bead portions. As shown in FIG. 16, the tire has two circumferential main grooves 2 (2a, 2b) extending in a tread circumference direction on a tread 1. In the illustrated example, the circumferential main grooves 2a, 2b are disposed on both sides of the equatorial plane of the tire CL in a manner such that one circumferential main groove is disposed on each side. In this example, the circumferential main groove 2a is disposed on a position that becomes an outside when the tire is fitted on the vehicle, and the circumferential main groove 2b is disposed on a position that becomes an inside when the tire is fitted on the vehicle. The two circumferential main grooves 2a, 2b and ground contact ends E in the tire width direction define three land rows 3. The land rows 3 include a center land row 3a defined between the two circumferential main grooves 2a, 2b, and two outer land rows 3b each defined by one of the ground contact ends E in the tire width direction and the circumferential main groove 2a (or 2b).

As shown in FIG. 16, the center land row 3*a* is a rib-shaped land continuously extending in the tread circumference direction, and the center land row 3*a* has center lug grooves 4 each opening into one of the two circumferential main groove 2*a*, 2*b* (opening into the circumferential main groove 2*a* in the illustrated example) and terminating within the center land row 3*a*. In the illustrated example, the center land row 3*a* further has center auxiliary lug grooves 5 each opening into the other circumferential main groove 2*b* to extend in the tread width direction within the center land row 3*a*. In FIG. 16, the center auxiliary lug groove 5 also opens into the one circumferential main groove 2*a*. As shown in FIG. 16, the center lug grooves 4 each opening into the circumferential main groove 2*a* and the center auxiliary lug grooves 5 each opening into the circumferential main grove 2*b* are alternately formed in the tread circumference direction. The groove width (opening width) of the center auxiliary lug grooves 5 is smaller than the groove width (opening width) of the center lug grooves 4. While the groove width of the center lug grooves 4 is for example 2 to 4 mm, the groove width of the center auxiliary lug grooves 5 is for example 0.4 to 1.5 mm.

The outer land rows 3*b* are rib-shaped lands continuously extending in the tread circumference direction. Each outer land row 3*b* has outer lug grooves 6 opening into the corresponding ground contact end E in the tire width direction and terminating within the outer land row 3*b*. Each outer land row 3*b* further has outer auxiliary lug grooves 7 opening into the circumferential main groove 2*a* (or 2*b*) that defines the outer land row 3*b*. The outer auxiliary lug grooves 7 have a smaller groove width than the outer lug grooves 6 and extend in the tread width direction. As illustrated, each outer auxiliary lug groove 7 also opens into the corresponding ground contact end E in the tire width direction. In particular, the outer auxiliary lug grooves 7 disposed on the outer land row 3*b* situated on the side that faces inward when the tire is fitted extend in a manner such that the grooves are interrupted along the way, and open into the circumferential main groove 2*b* and the corresponding ground contact end E in the tire width direction. In this embodiment, the center auxiliary lug grooves 5 and the outer auxiliary lug grooves 7 are formed as grooves; however, they may be formed as sipes. In the illustrated example, outer lug grooves 6 disposed on the outer land row 3*b* situated on the side that faces outward when the tire is fitted are communicated with the outer auxiliary lug grooves 7 and open into the corresponding ground contact end E in the tire width direction through the outer auxiliary lug grooves 7. As described above, the groove width (opening width) of the outer auxiliary lug grooves 7 is smaller than the groove width (opening width) of the outer lug grooves 6. While the groove width of the outer lug grooves 6 is for example 2 to 4 mm, the groove width of the outer auxiliary lug grooves 7 is for example 0.4 to 1.5 mm.

According to the tire of the embodiment, the tread 1 in the first place has two circumferential main grooves 2*a*, 2*b*, which allows drainage performance and steering stability to be both ensured. Specifically, the tire of the embodiment has a small tire width so that the footprint area is inherently smaller than the footprint area of the conventional tires. Thus, if the tire of the embodiment had three or more circumferential main grooves, the footprint area would be excessively decreased to degrade steering stability. On the other hand, if the tire had only a single circumferential main groove, drainage performance would be degraded. The two circumferential main grooves formed on both side of the tire equatorial plane CL in a manner such that one groove is formed on each side, as in the embodiment, is preferred in terms of balancing the rigidity between the tread half portions divided by the tire equatorial plane CL, which can also suppress occurrence of partial wear.

As described above, tires having a small width and a large diameter would have an increased rigidity around the tread. However, according to the tire of the embodiment, which has the center lug grooves 4 and the outer lug grooves 6 in the center land row 3*a* and the outer land rows 3*b*, each terminating at one end within the corresponding land row 3, the rigidity of each land row 3 can be moderately decreased so that the impact given when the tire contacts the ground in driving would be absorbed by the land rows 3 being deformed, which enhances silent performance. More specifically, if the center lug grooves 4 opened into both of the circumferential main groove 2*a*, 2*b*, or the outer lug grooves 6 each opened into both of the corresponding ground contact end E in the tire width direction and the circumferential main groove 2*a* (or 2*b*), the land rows 3 would be divided into blocks so that the circumferential end portion of each block would cause pattern noise when grounded on the road surface. Contrary to this, the center land row 3*a* and the outer land row 3*b* of the tire of the embodiment are rib-shaped lands continuously extending in the tread circumference direction, and are not divided by the center lug grooves 4 or the outer lug grooves 6 that have a wide groove width. Thus, pattern noise generation can be suppressed.

Furthermore, with the above-described arrangement of the center lug grooves 4 and the outer lug grooves 6 each terminating within the corresponding land rows 3*a*, 3*b*, drainage performance may be degraded. However, according to the embodiment, the outer land row 3*b* has the outer auxiliary lug grooves 7 each of which has a groove width smaller than the groove width of the outer lug groove 6 and extending in the tread width direction, which opens into the circumferential main groove 2*a* (or 2*b*). Thus, drainage performance can be ensured. In addition, with the outer auxiliary lug groove 7 being smaller in groove width, generation of pattern noise as described above can be suppressed so that silent performance can be also ensured. As described above, although tires with a smaller width have a smaller footprint area than conventional tires, the outer auxiliary lug groves 7 with a smaller groove width have a drainage function, so that drainage performance of the disclosed tire can be ensured without significantly reducing the footprint area.

As described above, with the tire of the embodiment, both of rolling resistance performance and silent performance can be ensured, and further, both of steering stability and drainage performance can be also ensured.

Here, in the tire of the disclosure, as shown in FIG. 16, widths W1, W2, in the tread width direction, of the outer land rows 3*b* are preferably larger than a width W3, in the tread width direction, of the center land row 3*a*. Tires with a smaller width and a larger diameter tend to have greater rigidity in the center portion of the tread. Therefore, with widths W1, W2 larger than a width W3, difference in rigidity, in the tread width direction, between the land rows can be decreased, so that partial wear or the like can be suppressed.

Further, in the tire of the disclosure, as shown in FIG. 16, the center land row 3*a* has the (first) center lug grooves 4 each opening into one of the two circumferential main grooves 2*a*, 2*b* and terminating within the center land row 3*a*. The one of the circumferential main grooves is disposed on the side that faces outward when the tire is fitted. The center land row 3*a* further has the center auxiliary lug grooves 5 each opening into the other circumferential main groove 2b and extending in the tread width direction within the center land row 3a. The center lug grooves 4 each opening into the one circumferential main groove 2a and the center auxiliary lug grooves 5 each opening into the other circumferential main groove 2b are preferably alternately formed in the tread circumference direction. The center lug grooves 4, each of which opens into the circumferential main groove 2a disposed on the side that faces outward when the tire is fitted, promote the deformation of the land rows 3 when a lateral force is applied in turning the vehicle, so that ground contact property is improved and steering stability can further be increased. Further, arranging such center lug grooves 4 alone may cause an uneven balance. However, the center auxiliary lug grooves 5, each opening into the circumferential main groove 2b disposed on the side that faces inward when the tire is fitted, are further formed and the center lug grooves 4 and the center auxiliary lug grooves 5 are alternately arranged in the tread circumference direction. Thus, the rigidity balance in the tread width direction within the center land row 3a becomes more uniform, which can suppress generation of partial wear or the like. In the embodiment shown in FIG. 16, although the center auxiliary lug grooves 5 with a smaller groove width opens into the other circumferential main groove 2b, second center lug grooves that open into the other circumferential main groove 2b may instead be provided to obtain the same effect as above. In this case, the second center lug grooves do not open into the one circumferential main groove 2a but open only into the other circumferential main groove 2b, terminating within the center land row 3a.

Furthermore, in the tire of the disclosure, the side edges of the land rows 3, or specifically the edges of the side walls of the land rows 3 defined by the openings into the tread 1 of the circumferential main groove 2a, 2b are preferably chamfered. Such chamfered edges can promote the deformation of the land rows 3 and improve ground contact property when the lateral force as above is applied, which consequently improves steering stability. The chamfered edges may be rounded or may be formed into plane surfaces.

Furthermore, for the tire of the disclosure, the outer land row 3b disposed on the side that faces outward when the tire is fitted, of the two outer land rows 3b, preferably has a negative ratio smaller than the negative ratio of the outer land row 3b disposed on the side that faces inward when the tire is fitted. On the side that faces outward when the tire is fitted, ground contact property is important to generate a lateral force in turning. Reducing the negative ratio will effectively secure the ground contact area. On the other hand, reducing the overall negative ratio may degrade drainage performance. Therefore, by relatively increasing the negative ratio on the side that faces inward when the tire is fitted, steering stability and drainage performance can be balanced.

Here, in the tire of the disclosure, the center auxiliary lug grooves 5 and the outer auxiliary lug grooves 7 preferably has a groove width of 0.4 to 1.5 mm. By making the width 0.4 mm or greater, drainage performance can further be increased; and by making the width 1.5 mm or less, silent performance can further be increased.

In the tire of the disclosure, the groove width of the center lug grooves 4 and the outer lug grooves 6 is preferably at least twice the groove width of the center auxiliary lug grooves 5 and the outer auxiliary lug grooves 7. With such a groove width, rigidity of the land rows 3 can be sufficiently reduced, so that silent performance can be improved.

The total groove width on the tread opening surface of the circumferential main grooves 2a, 2b is preferably 13% or more and 20% or less the ground contact width. By making the width 13% or more, rigidity of the lands can be sufficiently decreased so that silent performance can be improved; and by making it 20% or less, the ground contact area can be secured so that steering stability and traction performance can be secured. The term "ground contact width" as used herein refers to a width across the tread edges in the tire width direction, obtained when the tire is fitted on a rim, prepared to have an internal pressure corresponding to a maximum load prescribed for each vehicle on which the tire is fitted, and subjected to no load.

The outer auxiliary lug grooves 7 preferably open, on the outer land rows 3b, also into the ground contact ends E in the tire width direction. With this, drainage performance is improved. As shown in FIG. 16, the outer auxiliary lug grooves 7 can extend in a manner such that the grooves are interrupted along the way.

Further, the negative ratio of each land row 3 (the ratio of the groove area of the opening of the circumferential main grooves 2a, 2b on the tread 1) is preferably 5% or more and 15% or less. By making it 5% or more, drainage performance can be secured; and by making it 15% or less, steering stability can be secured.

The groove depth of the center auxiliary lug grooves 5 and the outer auxiliary lug grooves 7 as well as the groove depth of the center lug grooves 4 and the outer lug grooves 6 are preferably shallower than the groove depth of the circumferential main grooves 2a, 2b. The center auxiliary lug grooves 5 and the outer auxiliary lug grooves 7 as well as the center lug grooves 4 and the outer lug grooves 6 having a certain degree of depth can secure drainage performance. On the other hand, if the groove depth of the center auxiliary lug grooves 5 and the outer auxiliary lug grooves 7 as well as the center lug grooves 4 and the outer lug grooves 6 is excessively deep, the rigidity may be degraded. To prevent this, the groove depth of such grooves is formed shallower than the groove depth of the circumferential main grooves 2a, 2b. In this manner, the rigidity of the land rows 3 can be secured so that steering stability can be secured. In the meantime, the groove depth of the center lug grooves 4, the outer lug grooves 6, the center auxiliary lug grooves 5, and the outer auxiliary grooves 7 is preferably 50% or more the depth of the main grooves over 50% or more of the area of the extending length (length of periphery) of each of the center lug grooves 4, the outer lug grooves 6, the center auxiliary lug grooves 5, and the outer auxiliary grooves 7. It is particularly preferred that the groove depth of the center lug grooves 4, the outer lug grooves 6, the center auxiliary lug grooves 5, and the outer auxiliary grooves 7 be deepest near the center of the extending length of each of the center lug grooves 4, the outer lug grooves 6, the center auxiliary lug grooves 5, and the outer auxiliary grooves 7. With such a groove depth, a strain mitigating effect in kicking the land rows 3 can further be increased.

The length of the center lug grooves 4, the outer lug grooves 6, the center auxiliary lug grooves 5, and the outer auxiliary grooves 7 projected in the tread width direction is preferably 33% to 80% the width, in the tread width direction, of the center land row. By making it 33% or more, the strain mitigating effect in kicking the land rows 3 can further be increased; and by making it 80% or less, block rigidity can be secured. Furthermore, the center lug grooves 4 and the outer lug grooves 6 are preferably inclined relative to the tread width direction at an angle of 60° or less. With such inclination, block rigidity and the strain mitigating effect can be both ensured.

The tire disclosed herein may further include a circumferential narrow groove with a groove width (opening width) of less than 2 mm, which extends in at least one of the outer land rows 3b in the tread circumference direction. In the example shown in FIG. 16, the circumferential narrow groove can for example be arranged at the position where the outer auxiliary lug grooves 7 are interrupted. In at least one outer land row 3b, each outer lug groove 6 may not have to open directly into the ground contact end E in the tire width direction, but may open into the ground contact end E through the outer auxiliary lug groove 7.

The following describes Examples of the disclosure; however, the disclosure is in no way limited to the Examples.

EXAMPLES

To examine the effects of the tire disclosed herein, tires in accordance with Invention Example 1 to 8 and tires in accordance with Comparative Examples 1 and 2 were experimentally produced. Specifications of each tire are shown in Table 6. In Table 6, the term "one end open" used for the "center lug groove" means that the center lug grooves each open into only one of the circumferential main grooves and terminate within the center land row. For the "outer lug grooves", the term means that the outer lug grooves each open into one of the ground contact ends in the tire width direction and terminates within the corresponding outer land row. The term "both ends open" for the center lug grooves means that the center lug grooves do not terminate within the center land row but extend through it between the circumferential main grooves, and for the outer lug grooves, the term means that the outer lug grooves also do not terminate within the outer land row but extend from the corresponding ground contact end in the tire width direction to the corresponding circumferential main groove. The item "chamfer" indicates whether the side edges of the land rows are chamfered. In the item "negative ratio of outer land rows", the indication of "outside<inside" for example means that the negative ratio of the outer land row disposed on the side that faces outward when the tire is fitted is smaller than the negative ratio of the outer land row disposed on the side that faces inward when the tire is fitted. The indication of "outside>inside" means the opposite.

To evaluate tire performances of each of the above tires having a tire size of 145/60R17, the following tests were conducted.

<Steering Stability>

To evaluate the steering stability (steering wheel responsiveness) of each of the above tires, a driver drove on a test course, composed for example of a circuit track with a long straight path and a handling evaluation track with many moderate curves, at a speed range of a low speed to about 150 km/h, and conducted a feeling analysis. The steering stability was evaluated with indices based on the steering stability of the tire of Comparative Example 1 being 100. Greater index values imply better performance.

<Rolling Resistance Performance>

Each of the above tires was fitted on a rim with a width corresponding to the bead width of the tire to form a tire and rim assembly. The assemblies were each subjected to a maximum load specified for each of the vehicles on which the tire is fitted, and the rolling resistance of the tires was measured under the condition of drum rotation speed of 100 km/h. The evaluation results were indicated using indices based on the rolling resistance obtained for the tire of Comparative Example 1 being 100. Greater index values imply better rolling resistance performance.

<Drainage Performance>

A driver moved forward a vehicle fitted with each of the above tires into a pool having a water depth of 5 mm at various velocities, and the velocity at which hydroplaning phenomenon was generated was evaluated. The results were evaluated using indices based on the drainage performance of the tire of Comparative Example 1 being 100, which are shown in Table 6. Greater values imply better drainage performance of the tire.

<Silent Performance>

To evaluate the silent performance, a driver drove vehicles fitted with each of the above tires on a circuit path at speeds of 60 to 120 km/h and conducted a feeling analysis. In this evaluation, the silent performance of the tire according to Comparative Example 1 was taken 100, and relative to this, the silent performance of the other tires was evaluated. Greater values imply better quietness.

The evaluation results are shown in Table 6 below together with the specifications of tires.

TABLE 6

|  |  | Invention Exa. 1 | Invention Exa. 2 | Invention Exa. 3 | Invention Exa. 4 | Invention Exa. 5 |
|---|---|---|---|---|---|---|
| Figure |  | FIG. 16 | FIG. 16 | FIG. 16 | FIG. 16 | FIG. 16 |
| Center land row | Center lug groove | One end open | One end open | One end open | One end open | One end open |
|  | Center aux. lug groove | Present | Present | Present | Present | Present |
| Outer land row | Outer lug groove | One end open | One end open | One end open | One end open | One end open |
|  | Outer aux. lug groove | Present | Present | Present | Present | Present |
| Outer aux. lug groove width (mm) |  | 1.0 | 0.4 | 0.3 | 1.5 | 1.6 |
| Land row width |  | W3 < W1, W2 | W3 < W1, W2 | W3 < W1, W2 | W3 < W1, W2 | W3 < W1, W2 |
| Chamfer |  | Not chamfered | Not chamfered | Not chamfered | Not chamfered | Not chamfered |
| Negative ratio of outer land row |  | Outside < Inside | Outside < Inside | Outside < Inside | Outside < Inside | Outside < Inside |
| Steering stability |  | 105 | 105 | 105 | 105 | 105 |
| Rolling resistance peformance |  | 102 | 102 | 102 | 102 | 102 |
| Drainage performance |  | 100 | 100 | 98 | 100 | 101 |
| Silent performance |  | 105 | 105 | 106 | 105 | 102 |

|  |  | Invention Exa. 6 | Invention Exa. 7 | Invention Exa. 8 | Com. Exa. 1 | Com Exa. 2 |
|---|---|---|---|---|---|---|
| Figure |  | — | — | — | — | — |
| Center land row | Center lug groove | One end open | One end open | One end open | Both ends open | One end open |
|  | Center aux. lug groove | Absent | Present | Present | Absent | Absent |

TABLE 6-continued

| Outer land row Outer lug groove | One end open | One end open | One end open | Both ends open | One end open |
|---|---|---|---|---|---|
| Outer aux. lug groove | Present | Present | Present | Absent | Absent |
| Outer aux. lug groove width (mm) | 1.0 | 1.0 | 1.0 | — | — |
| Land row width | W3 < W1, W2 | W3 < W1, W2 | W3 < W1, W2 | W3 < W1, W2 | W3 < W1, W2 |
| Chamfer | Not chamfered | Chamfered | Not chamfered | Not chamfered | Not chamfered |
| Negative ratio of outer land row | Outside < Inside | Outside < Inside | Outside > Inside | Outside < Inside | Outside < Inside |
| Steering stability | 104 | 106 | 104 | 100 | 105 |
| Rolling resistance peformance | 102 | 102 | 102 | 100 | 102 |
| Drainage performance | 99 | 100 | 99 | 100 | 92 |
| Silent performance | 104 | 105 | 105 | 100 | 101 |

The results shown in Table 6 demonstrate that each of the tires according to Invention Examples 1 to 8 ensures both of rolling resistance performance and silent performance.

The results shown in Table 6 further demonstrate that Invention Example 1 having the center auxiliary lug grooves also in the center land row exhibits further improved steering stability than the Invention Example 6. In addition, Invention Example 7 whose side edges of the circumferential main grooves are chamfered exhibits further improved steering stability than Invention Example 1. Furthermore, Invention Example 1 whose negative ratio balance of the outer land rows has been optimized exhibits better steering stability and drainage performance than Invention Example 8. Still further, comparison between Invention Examples 1 to 5 reveals that Invention Examples 1, 2, and 4 with optimized outer auxiliary lug groove width have better balance between the drainage performance and the silent performance.

INDUSTRIAL APPLICABILITY

According to the disclosure, a pneumatic radial tire for passenger vehicles that ensure both of rolling resistance performance and silent performance can be placed on the market.

REFERENCE SIGNS LIST

1 Tread surface
2, 2a, 2b Circumferential main groove
3 Land row
3a Center land row
3b Outer land row
4 Center lug groove
5 Center auxiliary lug groove
6 Outer lug groove
7 Outer auxiliary lug groove
E Ground contact end in the tire width direction
CL Tire equatorial plane

The invention claimed is:

1. A pneumatic radial tire for passenger vehicles comprising a carcass composed of plies of radially arranged cords toroidally extending between a pair of bead portions, and a belt positioned radially outward than the carcass,
wherein, when the tire is fitted on a rim and prepared to have an internal pressure of 250 kPa or higher,
if the tire has a section width SW of less than 165 (mm), an SW/OD ratio of the section width SW to an outer diameter OD of the tire is 0.26 or less,
if the tire has a section width SW of 165 (mm) or greater, the section width SW and the outer diameter OD of the tire satisfy the relational expression: $OD \geq 2.135 \times SW + 282.3$,
the tire has two circumferential main grooves extending in a tread circumference direction on a tread, the two circumferential main grooves and ground contact ends in a tire width direction defining a plurality of land rows,
the land rows include a center land row defined between the two circumferential main grooves, and two outer land rows defined by the ground contact ends in the tire width direction and the circumferential main grooves,
the center land row is a rib-shaped land continuously extending in the tread circumference direction, the center land row having first center lug grooves,
one of the outer land rows is a rib-shaped land continuously extending in the tread circumference direction and has first outer lug grooves and first outer auxiliary lug grooves, the first outer lug grooves each opening, at one end, directly into one of the ground contact ends in the tire width direction and terminating, at the other end, within the one of the outer land rows, the first outer auxiliary lug grooves opening into the circumferential main groove defining the one of the outer land rows, the first outer auxiliary lug grooves having a groove width smaller than a groove width of the first outer lug grooves and extending in a tread width direction, and
wherein each of the first center lug grooves opens into one of the two circumferential main grooves and terminates within the center land row, the one of the circumferential main grooves being on the side that faces outward when the tire is fitted; and the center land row further has second center lug grooves or center auxiliary lug grooves, the second center lug grooves each opening into the other of the circumferential main grooves and terminating within the center land row, the center auxiliary lug grooves each opening into the other of the circumferential main grooves to extend in the tread width direction within the center land row, the center auxiliary lug grooves having a groove width smaller than a groove width of the first center lug grooves;
the first center lug grooves and the second center lug grooves or the center auxiliary lug grooves are alternately formed in the tread circumference direction;
the tire has a ground contact area of no smaller than 10000 mm$^2$ when the tire is subjected to a maximum load prescribed for each vehicle on which the tire is fitted;
the belt is composed of belt cords having a Young's modulus of 45000 MPa or higher; and
the other of the outer land rows is a rib-shaped land continuously extending in the tread circumference direction and has second outer lug grooves and second outer auxiliary lug grooves, the second outer lug grooves each opening, at one end, into the second outer auxiliary lug grooves and terminating, at the other end, within the other of the outer land rows, the second outer auxiliary lug grooves opening, at one end, into the other of the ground contact ends in the tire width direction and, at the other end, into the circumferential main groove defining the other of the outer land rows, the second outer auxiliary lug grooves having a groove width smaller than a groove width of the second outer lug grooves and extending in a tread width direction.

2. The pneumatic radial tire for passenger vehicles according to claim 1, wherein each of the outer land rows has a width, in the tread width direction, larger than a width, in the tread width direction, of the center land row.

3. The pneumatic radial tire for passenger vehicles according to claim 1, wherein side edges of the land rows are chamfered.

4. The pneumatic radial tire for passenger vehicles according to claim 1, wherein the outer land row, of the two outer land rows, disposed on the side that faces outward when the tire is fitted has a negative ratio less than the negative ratio of the outer land row disposed on the side that faces inward when the tire is fitted.

5. The pneumatic radial tire for passenger vehicles according to claim 1, wherein the center auxiliary lug grooves and the outer auxiliary lug grooves have a groove width of 0.4 to 1.5 mm.

6. The pneumatic radial tire for passenger vehicles according to claim 1, wherein the tire has a rim diameter of 18 inches or more.

7. The pneumatic radial tire for passenger vehicles according to claim 1, wherein the tire has an aspect ratio of 65% or less.

8. The pneumatic radial tire for passenger vehicles according to claim 1, wherein the tire has a ground contact length of 90 to 140 mm when the tire is subjected to a maximum load prescribed for each vehicle on which the tire is fitted.

9. The pneumatic radial tire for passenger vehicles according to claim 1, wherein the tire further comprises an inner liner having a thickness of 0.6 mm or greater.

10. The pneumatic radial tire for passenger vehicles according to claim 1, wherein, in the tread width direction, widths of the outer land rows are larger than a width of the center land row.

11. The pneumatic radial tire for passenger vehicles according to claim 1, wherein the outer land row disposed on the side that faces outward when the tire is fitted, of the two outer land rows, has a negative ratio smaller than the negative ratio of the outer land row disposed on the side that faces inward when the tire is fitted.

12. The pneumatic radial tire for passenger vehicles according to claim 1, wherein the groove widths of the first center lug grooves and the first outer lug grooves are at least twice the groove widths of the center auxiliary lug grooves and the first outer auxiliary lug grooves, respectively.

13. The pneumatic radial tire for passenger vehicles according to claim 1, wherein the total groove width on the tread opening surface of the circumferential main grooves is 13% or more and 20% or less the ground contact width.

14. The pneumatic radial tire for passenger vehicles according to claim 1, wherein the groove depths of the first and second center lug grooves, the first outer lug grooves, the center auxiliary lug grooves, and the first outer auxiliary lug grooves are 50% or more the depth of the main grooves over 50% or more of the area of the extending length of each of the first and second center lug grooves, the first outer lug grooves, the center auxiliary lug grooves, and the first outer auxiliary lug grooves.

15. A method of using the pneumatic radial tire according to claim 1, wherein the tire is fitted on a vehicle with the one of the circumferential main grooves being on the side that faces outward.

16. A vehicle comprising the tire according to claim 1, wherein the tire is fitted on the vehicle with the one of the circumferential main grooves being on the side that faces outward.

17. The pneumatic radial tire for passenger vehicles according to claim 1, wherein the center land row has the center auxiliary lug grooves each opening into the one and the other of the circumferential main grooves.

* * * * *